（12） United States Patent
Sugiura et al.

(10) Patent No.: US 11,062,609 B2
(45) Date of Patent: Jul. 13, 2021

(54) INFORMATION PROCESSING APPARATUS AND INFORMATION PROCESSING METHOD

(71) Applicant: KABUSHIKI KAISHA TOSHIBA, Tokyo (JP)

(72) Inventors: Takayuki Sugiura, Kanagawa (JP); Manabu Nishiyama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 28 days.

(21) Appl. No.: 16/717,772

(22) Filed: Dec. 17, 2019

(65) Prior Publication Data

US 2020/0126425 A1  Apr. 23, 2020

Related U.S. Application Data

(62) Division of application No. 15/441,701, filed on Feb. 24, 2017, now abandoned.

(30) Foreign Application Priority Data

May 24, 2016  (JP) .................................. 2016-103408

(51) Int. Cl.
 *H04N 7/18* (2006.01)
 *G08G 1/16* (2006.01)
 *G06K 9/00* (2006.01)

(52) U.S. Cl.
 CPC ......... *G08G 1/167* (2013.01); *G06K 9/00805* (2013.01); *H04N 7/183* (2013.01)

(58) Field of Classification Search
 CPC .......... G08G 1/167; G08G 1/04; G08G 1/163; H04N 7/183; G06K 9/00805; G06K 9/3233; B60R 2300/00
 See application file for complete search history.

(56) References Cited

U.S. PATENT DOCUMENTS

| 6,424,370 | B1* | 7/2002 | Courtney ........... G06K 9/00342 348/143 |
| 8,990,015 | B2* | 3/2015 | Citelli ................... B60W 40/02 701/532 |
| 9,805,274 | B2* | 10/2017 | Ayvaci ...................... G06K 9/52 |
| 10,073,456 | B2* | 9/2018 | Mudalige ............. G05D 1/0214 |
| 10,157,544 | B2* | 12/2018 | Altinger .................... G08G 1/04 |

(Continued)

FOREIGN PATENT DOCUMENTS

JP  2009-070243  4/2009
JP  2011-248445  12/2011
(Continued)

OTHER PUBLICATIONS

English-language machine translation of JP2011-248445.
English-language machine translation of WO2012/131871.
English-language machine translation of JP2013-025528.

*Primary Examiner* — Shadan E Haghani
(74) *Attorney, Agent, or Firm* — Nixon & Vanderhye, P.C.

(57) ABSTRACT

An information processing apparatus according to an embodiment includes a determination unit and an output control unit. The determination unit determines whether a particular part related to a type of an object is included in a blind spot of an object of interest. The output control unit outputs output information when it is determined that the part is included in the blind spot.

11 Claims, 18 Drawing Sheets

(56) References Cited

U.S. PATENT DOCUMENTS

| | | | |
|---|---|---|---|
| 2009/0140881 A1 | 6/2009 | Sakai et al. | |
| 2014/0309789 A1 | 10/2014 | Ricci | |
| 2014/0309864 A1 | 10/2014 | Ricci | |
| 2014/0336866 A1* | 11/2014 | Kloeden | G06K 9/00791 701/30.3 |
| 2017/0220874 A1 | 8/2017 | Ayvaci | |
| 2018/0178786 A1 | 6/2018 | Takaki | |
| 2018/0326905 A1 | 11/2018 | Nakata | |

FOREIGN PATENT DOCUMENTS

| | | |
|---|---|---|
| JP | 2013-025528 | 2/2013 |
| JP | 2015-156191 | 8/2015 |
| WO | 2012/131871 | 10/2012 |

* cited by examiner

PARTS MANAGEMENT INFORMATION 10J

| TYPE | PARTS |
|---|---|
| VEHICLE | DIRECTION INDICATOR, STOP LAMP, HEAD LAMP, TAIL LAMP, WHEEL, BEGINNER DRIVER SIGN, SENIOR DRIVER SIGN, DISPLAY |
| HUMAN | HEAD, FACE, HAND, FOOT |

INFORMATION PROCESSING APPARATUS AND INFORMATION PROCESSING METHOD

CROSS-REFERENCE TO RELATED APPLICATIONS

This application is a divisional of U.S. application Ser. No. 15/441,701, filed Feb. 24, 2017, which claims priority from Japanese Patent Application No. 2016-103408, filed on May 24, 2016. The entire contents of each of these applications are hereby incorporated by reference in this application.

FIELD

Embodiments described herein relate generally to an information processing apparatus and an information processing method.

BACKGROUND

There have been known apparatuses which output information regarding a blind spot of a moving object such as a vehicle. For example, JP 2015-156191 A discloses an apparatus which notifies a driver of a warning when a occluding ratio of an A pillar to an object of interest viewed from a viewpoint of the driver is equal to or greater than a predetermined value.

However, such notification is performed in accordance with occluding ratios, and therefore, information regarding the blind spot is not appropriately notified. In addition, in some cases, a driver feel disturbed when receiving information of a blind spot which the driver already recognizes. As described above, it is conventionally difficult to appropriately output information of the blind spot.

DETAILED DESCRIPTION

An information processing apparatus according to an embodiment includes a determination unit and an output control unit. The determination unit determines whether a particular part related to a type of an object is included in a blind spot of an object of interest. The output control unit outputs output information when it is determined that the part is included in the blind spot.

Hereinbelow, an information processing apparatus and an information processing method will be described in detail with reference to the accompanying drawings.

First Embodiment

Figure 1:
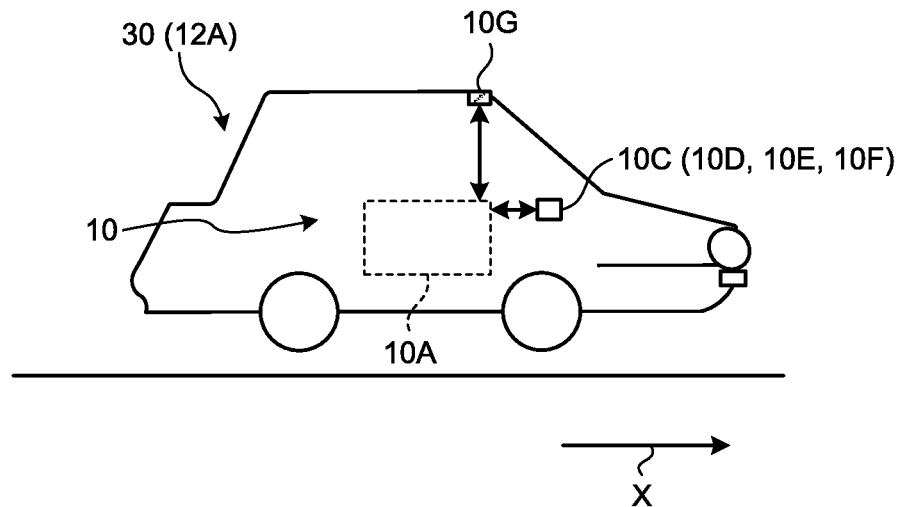
FIG. 1 is a diagram illustrating an example of an information processing apparatus according to a first embodiment.

FIG. 1 is a diagram illustrating an example of an information processing apparatus 10 according to an embodiment. The information processing apparatus 10 outputs output information in accordance with an object included in a blind spot of an object of interest (output-destination moving object 30, which is a moving object receiving information from the information processing apparatus 10).

In the embodiment, a description will be given for, as an example, a case where the information processing apparatus 10 is mounted on the output-destination moving object 30 as the object of interest.

The object of interest is an object to which the information processing apparatus 10 outputs output information. In the embodiment, a case where the object of interest is a moving object will be described. The object of interest may be a stationary object. In the following description, the object of interest is referred to as the output-destination moving object 30 and the blind spot means a blind spot of the output-destination moving object 30.

The output-destination moving object 30 is a movable object. Examples of the output-destination moving object 30 include a vehicle, a dolly, a flyable object (a manned plane, an unmanned aerial vehicle (such as a drone)), and a robot. In the embodiment, a description will be given for, as an example, a case where the output-destination moving object 30 is a vehicle 12A. Examples of the vehicle 12A include a two-wheeled automobile, a three-wheeled automobile, and a four-wheeled automobile. In the embodiment, a description will be given for, as an example, a case where the vehicle 12A is a four-wheeled automobile.

An object included in the blind spot of the output-destination moving object 30 is a movable object (moving object) or a stationary object. Examples of the object included in the blind spot include a living organism (a human, an animal) and a vehicle. A human (such as a driver) getting on the movable object (such as a vehicle) is also included in the object included in the blind spot. In the following description, an object included in the blind spot of the output-destination moving object 30 may be referred to as an occluded object 34.

Figure 2:
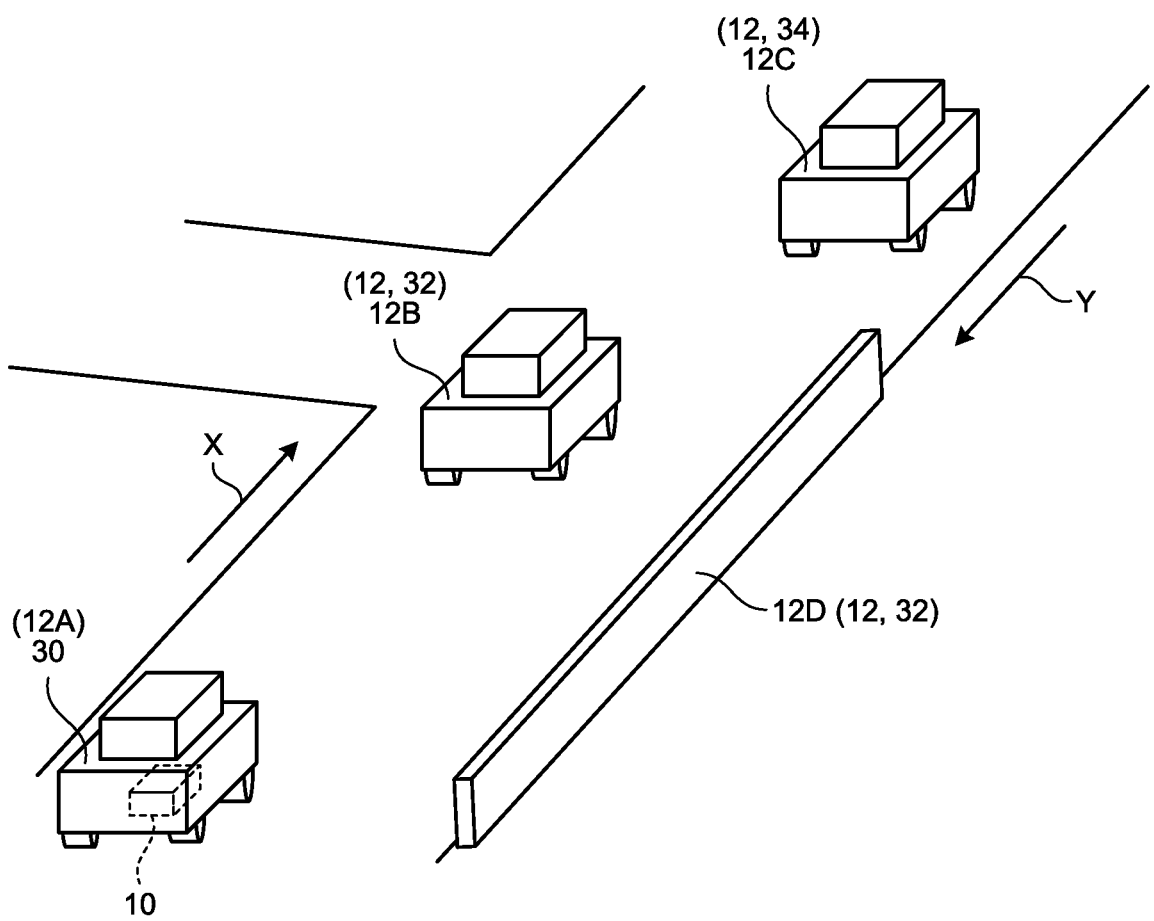
FIG. 2 is a schematic diagram illustrating an example of usage of the information processing apparatus.

FIG. 2 is a schematic diagram illustrating an example of usage of the information processing apparatus 10 of the embodiment.

For example, it is assumed that the vehicle 12A including the information processing apparatus 10 mounted thereon is travelling in a moving direction X. At that time, the vehicle 12A, which is the output-destination moving object 30, is used as a viewpoint. Other vehicles 12B and 12C, and a stationary object 12D located around the vehicle 12A are visible from the viewpoint of the vehicle 12A. Therefore, these objects function as an obstacle 32 which produces a blind spot of the vehicle 12A. There may be a case where the entirety thereof is visible as in a case of the vehicle 12B or the stationary object 12D, and a case where a part thereof is visible as in a case of the vehicle 12C.

Furthermore, at least a part of the vehicle 12C is occluded by the vehicle 12B as the obstacle 32. Therefore, in that case, the vehicle 12C functions as an occluded object 34 included in the blind spot of the vehicle 12A. There may be a case where still another object is present on a downstream side of the vehicle 12C in a travelling direction of the vehicle 12A (an arrow X direction). It is assumed that at least a part of the object is occluded by the vehicles 12B, 12C, or the like. In such a case, the object functions as an occluded object 34 included in the blind spot, as well. In that case, the vehicle 12C functions as the occluded object 34 and the obstacle 32.

In the embodiment, a description will be given for, as an example, a case where the vehicle 12C is included in the blind spot of the output-destination moving object 30. It is needless to say that the object included in the blind spot of the output-destination moving object 30 is not limited to the vehicle 12C depending on a positional relationship between the output-destination moving object 30 and another object.

In the embodiment, the information processing apparatus 10 outputs output information in accordance with an occluded object 34 (here, the vehicle 12C) which is an object included in the blind spot of the output-destination moving object 30 (vehicle 12A). The occluded object 34 may be an object at least a part of an area of which is included in the blind spot of the output-destination moving object 30.

Referring back to FIG. 1, the description will be continued. The information processing apparatus 10 includes a processing circuit 10A, an output circuit 10C, and a sensor 10G.

The output circuit 10C outputs output information. The output circuit 10C has a display function which displays the output information, a sound outputting function which outputs sound indicating the output information, a communication function which transmits the output information, and the like. For example, the output circuit 10C includes a communication circuit 10D, a display 10E, and a speaker 10F. In the embodiment, the output circuit 10C is preferably disposed at a position where the output information can be output to a driver of the vehicle 12A.

The communication circuit 10D transmits information such as output information to another apparatus. For example, the communication circuit 10D transmits the output information to a terminal device which the driver of the vehicle 12A has, through a known communication line. The display 10E displays the output information. Examples of the display 10E include a known liquid crystal display (LCD), a projection apparatus, and a light. The speaker 10F outputs sound indicating the output information.

The sensor 10G is an external sensor which observes surroundings information of the output-destination moving object 30. The surroundings information is information indicating a state of surroundings including information of the surroundings of the output-destination moving object 30. In addition to the surroundings information of the moving object 30, information regarding the moving object 30 may be further acquired. Examples of the sensor 10G include an image capturing apparatus which obtains captured image data (hereinafter simply referred to as a captured image) by image capturing, and a distance sensor (a millimeter-wave radar, a laser sensor). As the laser sensor, a laser sensor employing a laser imaging detection and ranging (LiDAR) method is exemplified.

The surroundings information of the output-destination moving object 30 is information indicating a state of surroundings of the output-destination moving object 30. The surroundings of the output-destination moving object 30 is an area in a predetermined range of a distance from the output-destination moving object 30. The range may be set in advance. If the sensor 10G is an image capturing apparatus, the surroundings information is a captured image. In that case, a range obtained by the surroundings information is a range of image capturing. Alternatively, if the sensor 10G is a millimeter-wave radar or a laser sensor, the surroundings information is distance information. In detail, the surroundings information in that case is, for example, a depth map which defines a distance from the sensor 10G for each pixel.

In the embodiment, a description will be given for, as an example, a case where the sensor 10G is an image capturing apparatus. Therefore, in the embodiment, a description will be given for, as an example, a case where the surroundings information sensed by the sensor 10G is a captured image of surroundings (in particular, in a forward direction of travel) of the output-destination moving object 30.

Figure 3:
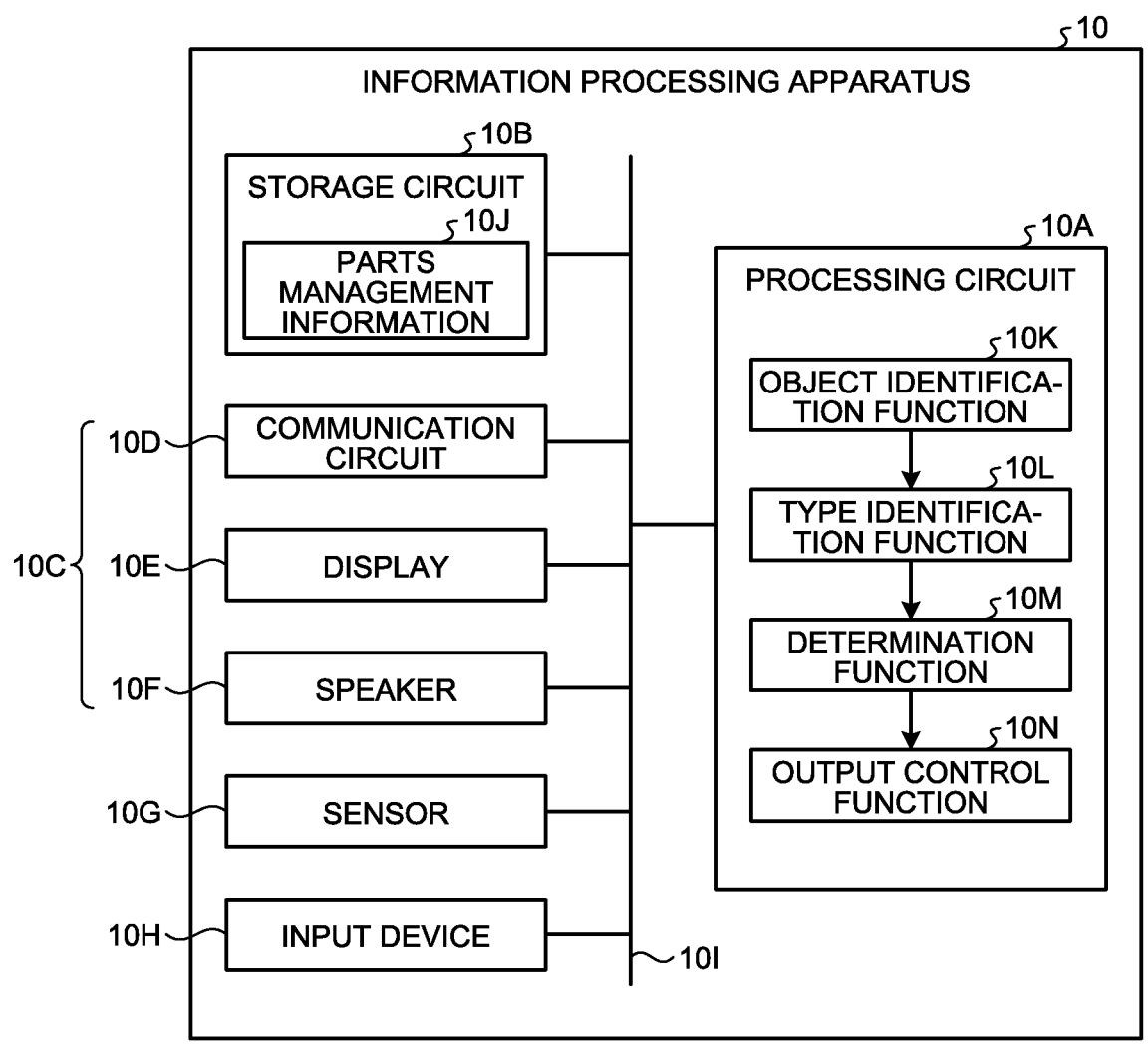
FIG. 3 is a block diagram illustrating an example of a configuration of the information processing apparatus.

A configuration of the information processing apparatus 10 will be described in detail. FIG. 3 is a block diagram illustrating an example of the configuration of the information processing apparatus 10.

The information processing apparatus 10 outputs output information in accordance with the occluded object 34 included in the blind spot of the output-destination moving object 30. The information processing apparatus 10 is, for example, a dedicated or general-purpose computer. The information processing apparatus 10 includes the processing circuit 10A, a storage circuit 10B, the output circuit 10C, the sensor 10G, and an input device 10H. As described above, the output circuit 10C includes the communication circuit 10D, the display 10E, and the speaker 10F.

The processing circuit 10A, the storage circuit 10B, the output circuit 10C, the sensor 10G, and the input device 10H are connected through a bus 10I. The storage circuit 10B, the output circuit 10C (the communication circuit 10D, the display 10E, and the speaker 10F), the sensor 10G, and the input device 10H may be connected to the processing circuit 10A by wire or wirelessly. At least one of the storage circuit 10B, the output circuit 10C (the communication circuit 10D, the display 10E, and the speaker 10F), the sensor 10G, and the input device 10H may be connected to the processing circuit 10A through a network.

The input device 10H receives various instructions and input of information from a user. Examples of the input device 10H include a pointing device such as a mouse and a trackball, or an input device such as a keyboard.

The storage circuit 10B stores various kinds of data. Examples of the storage circuit 10B include a semiconductor memory element such as a random access memory (RAM) and a flash memory, a hard disk, and an optical disc. The storage circuit 10B may be a storage device disposed outside the information processing apparatus 10. Alternatively, the storage circuit 10B may be a storage medium. Specifically, the storage medium may be that having a program or various kinds of information downloaded through a local area network (LAN), the Internet, or the like, and stored or temporarily stored therein. The storage circuit 10B may be constituted by a plurality of storage media.

In the embodiment, the storage circuit 10B stores parts management information 10J. The parts management information 10J is information for managing parts related to a type of an object. In detail, the parts management information 10J is information for managing parts related to a type of an occluded object 34. The data format of the parts management information 10J is not limited. Examples of the parts management information 10J include a database and a table.

Figures 4, 5:
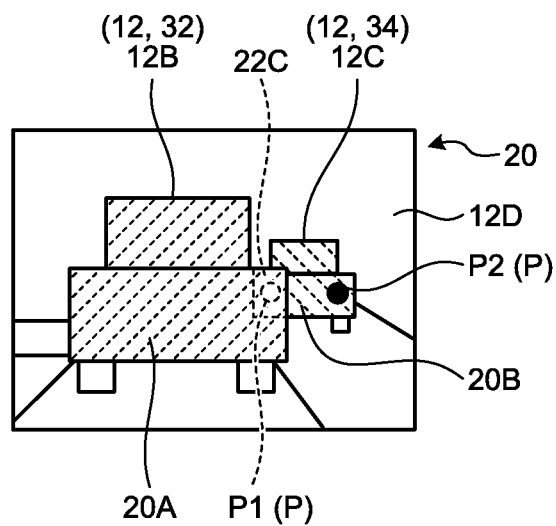
FIG. 4 is a schematic diagram illustrating an example of a data configuration of parts management information.
FIG. 5 is a schematic diagram illustrating an example of a captured image.

FIG. 4 is a schematic diagram illustrating an example of a data configuration of the parts management information 10J. The parts management information 10J is information in which a type of an object and a part are associated with each other. Examples of the type of an object include a vehicle, and a human.

Examples of the parts include a component, a region (a part of body of living organism). In other words, each of the parts registered with the parts management information 10J is a component or a region which constitutes a part of the object of the type related thereto, or an article attached to the object of the type related thereto. Each of the parts registered with the parts management information 10J is preferably a component or a region indicating motion and/or motion plan of the object of the type related thereto. The parts registered with the parts management information 10J preferably indicate a travelling condition and/or travelling properties of the object of the type related thereto.

Specific examples of the parts include a vehicle-mounted component, a vehicle-mounted sign, and a region of human body. The vehicle-mounted component is, for example, a lighting device. Examples of the lighting device include a headlight, a fog lamp, a direction indicator, a stop lamp, a head lamp, and a tail lamp. Examples of the vehicle-mounted sign include a beginner driver sign, a senior driver sign, and a display. Examples of the region of human body include a face, a hand, and a foot.

Parts related to types of objects are registered with the parts management information 10J in advance. Each piece of information registered with the parts management information 10J may be appropriately changeable by an operational instruction by a user, or the like. FIG. 4 illustrates, as an example, a vehicle and a human as the types of objects registered with the parts management information 10J. However, other types or subdivided types may be registered with the parts management information 10J. For example, subdivided types such as a two-wheeled automobile, a four-wheeled automobile, and a bicycle may be registered with the parts management information 10J.

Referring back to FIG. 3, the description will be continued. Next, the processing circuit 10A will be described. The processing circuit 10A includes an object identification function 10K, a type identification function 10L, a determination function 10M, and an output control function 10N.

Each of the processing functions in the processing circuit 10A is stored in the storage circuit 10B in a form of a computer-executable program. The processing circuit 10A is a processor which reads a program from the storage circuit 10B and executes the program, thereby realizing a function corresponding to each program.

The processing circuit 10A which has read each program has each function illustrated in the processing circuit 10A in FIG. 3. A description will be given based on an assumption that the object identification function 10K, the type identification function 10L, the determination function 10M, and the output control function 10N are realized by the single processing circuit 10A in FIG. 3.

The processing circuit 10A may be configured by combining a plurality of independent processors for realizing each of the functions. In that case, the processors execute programs, respectively, thereby realizing respective functions. There may be a case where each processing function is configured as a program, and one processing circuit executes each program, or a case where a specific function is implemented in a dedicated independent program execution circuit.

The term "processor" used in the embodiment and embodiments described later means, for example, a central processing unit (CPU), a graphical processing unit (GPU), or an application specific integrated circuit (ASIC), circuits of a programmable logic device (such as a simple programmable logic device (SPLD), a complex programmable logic device (CPLD), and a field programmable gate array (FPGA)). The processor reads and executes the program stored in the storage circuit 10B, thereby realizing the function. A configuration may be employed in which a program is directly incorporated into a circuit of the processor instead that the program is stored in the storage circuit 10B. In that case, the processor reads and executes the program incorporated into the circuit, thereby realizing the function.

The object identification function 10K is an example of an object identification unit. The object identification function 10K identifies the occluded object 34 included in the blind spot in a travelling environment of the output-destination moving object 30 based on surroundings information of the output-destination moving object 30.

For example, it is assumed that the information processing apparatus 10 is mounted on the vehicle 12A. Then, it is assumed that the vehicle 12A is the output-destination moving object 30. Then, it is assumed that the output-destination moving object 30 is in a travelling environment illustrated in FIG. 2. Then, it is assumed that the sensor 10G mounted on the vehicle 12A has acquired, as the surroundings information, a captured image which is obtained by pointing, from the vehicle 12A, a lens in a moving direction X of the vehicle 12A. In that case, the object identification function 10K identifies the occluded object 34 in the travelling environment of the vehicle 12A using the captured image.

FIG. 5 is a schematic diagram illustrating an example of a captured image 20. For example, it is assumed that the captured image 20 illustrated in FIG. 5 has been obtained by the sensor 10G. In that case, by performing an image analysis of the captured image 20, the object identification function 10K identifies, among objects 12 included in the captured image 20, the occluded object 34 at least a part of an area of which is included in the blind spot.

For example, the object identification function 10K stores a first feature information in advance. The first feature information indicates a feature observed when an image of an object at least a part of which is occluded by another object is captured. The first feature information is, for example, information indicating a shape of only a part of an object. Then, the object identification function 10K identifies, among the objects included in the captured image 20, an object indicated by the first feature information, thereby identifying the object occluded by another object. Consequently, the object identification function 10K identifies the occluded object 34 at least a part of an area of which is included in the blind spot 20A. For example, in the example illustrated in FIG. 5, the object identification function 10K identifies the vehicle 12C as the occluded object 34 by analyzing the captured image 20.

The object identification function 10K may identify the occluded object 34 using other methods.

For example, the object identification function 10K stores second feature information in advance. The second feature information indicates a feature observed when an image of an object which is not occluded by another object is captured. The second feature information is, for example, a shape or color of the object. Then, the object identification function 10K identifies, among the objects included in the captured image 20, an object indicated by the second feature information, thereby identifying the obstacle 32. In the example illustrated in FIG. 5, specifically, the object identification function 10K identifies, as the obstacle 32, the vehicle 12B indicating a shape of a vehicle which is not occluded in the captured image 20.

Then, the object identification function 10K estimates an area of the obstacle 32 in the captured image 20 as the blind spot 20A. Furthermore, the object identification function 10K identifies the vehicle 12C at least a part of which is occluded by the blind spot 20A. Consequently, the object identification function 10K may identify the vehicle 12C as the occluded object 34.

For example, the object identification function 10K may employ a method in which a position of an object in the captured image 20 is detected by a template prepared in advance, and then the template is divided. Then, the object identification function 10K may identify the occluded object 34 by detecting a portion inconsistent between the obstacle 32 and the captured image 20 (such as an occluded region 22C in FIG. 5).

In a case where the surroundings information is distance information, the object identification function 10K may extract a line which connects borders of discontinuous changes in distance as a boundary of the blind spot 20A. Then, the object identification function 10K identifies an area having the shortest distance among areas partitioned by the boundary as the obstacle 32. Furthermore, the object identification function 10K may identify another area continuous with the identified obstacle 32 through the boundary as the occluded object 34.

The information processing apparatus 10 may acquire surroundings information from the sensor 10G disposed outside the output-destination moving object 30. In that case, by using the position of the output-destination moving object 30 as a viewpoint and in a manner similar to that of a blind spot identification function 14S and an object identification function 14K (see a second embodiment and FIG. 8) described later, the object identification function 10K may identify the blind spot 20A and the occluded object 34 (described in detail later).

The position of the output-destination moving object 30 may be acquired from global positioning system (GPS) or the like on the output-destination moving object 30. Other methods may be used as a method for acquiring the position of the output-destination moving object 30. For example, the position of the output-destination moving object 30 may be acquired by acquiring time-series motion through visual simultaneous localization and mapping (VSLAM) using captured images. The position of the output-destination moving object 30 may be acquired by acquiring acceleration or angular velocity of the output-destination moving object 30 from a gyro sensor or an inertial measurement unit (IMU) provided to the output-destination moving object 30. Alternatively, the position of the output-destination moving object 30 on the map may be acquired by acquiring a three-dimensional point cloud by LiDAR or the like, and performing matching with a three-dimensional map retained in advance.

The position of the output-destination moving object 30 may be a viewpoint (position of the eyes) of a driver on the output-destination moving object 30 in a case where the output-destination moving object 30 is a vehicle. In that case, a configuration is employed in which the output-destination moving object 30 is provided with an image capturing apparatus capable of capturing an image of the head of the driver. Then, the object identification function 10K may estimate the viewpoint of the driver from the captured image. Known methods may be used for the estimation. For example, the object identification function 10K estimates, from the captured image, an orientation of the head, a position of the eyes, a line of sight of the driver, and estimates the viewpoint of the driver from estimation results thereof.

Furthermore, the position of the output-destination moving object 30 may be a position where the sensor 10G is disposed. In that case, the position where the sensor 10G is disposed may be acquired by retaining in advance a correlation between a centroid position of the output-destination moving object 30 and the position where the sensor 10G is disposed. The sensor 10G may be configured to include a plurality of sensors. In that case, information obtained by the plurality of sensors 10G may be used as surroundings information to identify the occluded object 34.

Next, the type identification function 10L will be described. The type identification function 10L is an example of a type identification unit. The type identification function 10L identifies a type of the occluded object 34 identified by the object identification function 10K. The type identification function 10L stores in advance information indicating features such as a color and a shape of an object which is associated with the type of the object in advance. Then, the type identification function 10L may identify the type of the occluded object 34 by reading the type related to features such as a color and a shape of the occluded object 34.

For example, when the vehicle 12C is identified as the occluded object 34, the type identification function 10L identifies a type of the vehicle 12C as a "vehicle".

The determination function 10M is an example of a determination unit. It is determined whether a particular part related to a type of an object is included in the blind spot 20A of the output-destination moving object 30. In detail, the determination function 10M determines whether a part related to the type of the occluded object 34 included in the blind spot 20A is included in the blind spot 20A of the output-destination moving object 30.

Specifically, the determination function 10M reads a part related to the type identified by the type identification function 10L from the parts management information 10J. Then, the determination function 10M determines whether the read part is included in the blind spot 20A.

In the embodiment, the determination function 10M determines whether the part is included in the blind spot 20A caused by the obstacle 32 occluding the occluded object 34 based on a visible region of the occluded object 34 partly outside the blind spot 20A. A detailed description will be given using FIG. 5. For example, it is assumed that the occluded object 34 is the vehicle 12C. Then, it is assumed that, in the parts management information 10J, a part related to the type "vehicle" of the vehicle 12C is a direction indicator. In that case, the determination function 10M analyzes a visible region 20B of the vehicle 12C outside the blind spot 20A in the captured image 20. Consequently, the determination function 10M estimates a part P included in an occluded region 22C. The occluded region 22C is a region in the blind spot 20A in the vehicle 12C (occluded object 34).

Specifically, the determination function 10M stores in advance a type of an object, and shapes of respective parts P included in the object and relative positions thereof with respect to other parts P correspondingly to each other. Then, the determination function 10M estimates, from a shape of a part P (in FIG. 5, a direction indicator P2) included in the visible region 20B in the vehicle 12C and a position of the part P (in FIG. 5, the direction indicator P2) included in the visible region 20B, another part P (in FIG. 5, a direction indicator P1) of which a relative position with respect to the direction indicator P2 is located in the occluded region 22C. Consequently, the determination function 10M estimates the part P (direction indicator P1) included in the occluded region 22C.

Then, it is assumed that the determination function 10M has estimated that a part P related to the type "vehicle" of the vehicle 12C is present in the occluded region 22C of the vehicle 12C. In that case, the determination function 10M determines that a particular part P related to the type of the occluded object 34 (vehicle 12C) is included in the blind spot 20A of the output-destination moving object 30.

The output control function 10N is an example of an output control unit. The output control function 10N outputs output information when it is determined that the particular part P related to the type of the occluded object 34 is included in the blind spot 20A.

The output information is information indicating the blind spot 20A. Specifically, the output information includes at least one of information regarding the blind spot 20A, information regarding the part P included in the blind spot 20A, and information regarding the object (occluded object 34) included in the blind spot 20A.

The information regarding the blind spot 20A includes information indicating a range of the blind spot 20A, a position of the blind spot 20A, a shape of the blind spot 20A, and a state of the blind spot 20A. The position of the blind spot 20A may be a relative position of the blind spot 20A employing the output-destination moving object 30 as a reference, or may be an absolute position.

The information regarding the part P in the blind spot 20A includes the type of the part P included in the blind spot 20A, a position of the part P, a shape of the part P, and a state (a color or a blinking state) of the part P.

The information regarding the occluded object 34 includes the number of the occluded object 34 included in the blind spot 20A, a type of occluded object 34, a moving direction of the occluded object 34, a position of the occluded object 34, and a speed of the occluded object 34. The position of the occluded object 34 may be a relative position with respect to the output-destination moving object 30, or may be an absolute position.

In the embodiment, the output control function 10N controls the output circuit 10C to output output information.

Therefore, the output circuit 10C outputs the output information. Specifically, the communication circuit 10D in the output circuit 10C transmits the output information to a mobile terminal and the like carried by the driver of the output-destination moving object 30. For example, the output information is displayed on the display 10E in the output circuit 10C. For example, the display 10E performs illumination with light having a color and an intensity in accordance with the output information in an illuminating state (illuminating or blinking) in accordance with the output information.

The output control function 10N controls the speaker 10F to output sound in accordance with the output information. The sound in accordance with the output information may be audio indicating the output information, or may be warning sound in accordance with the output information.

Figure 6:
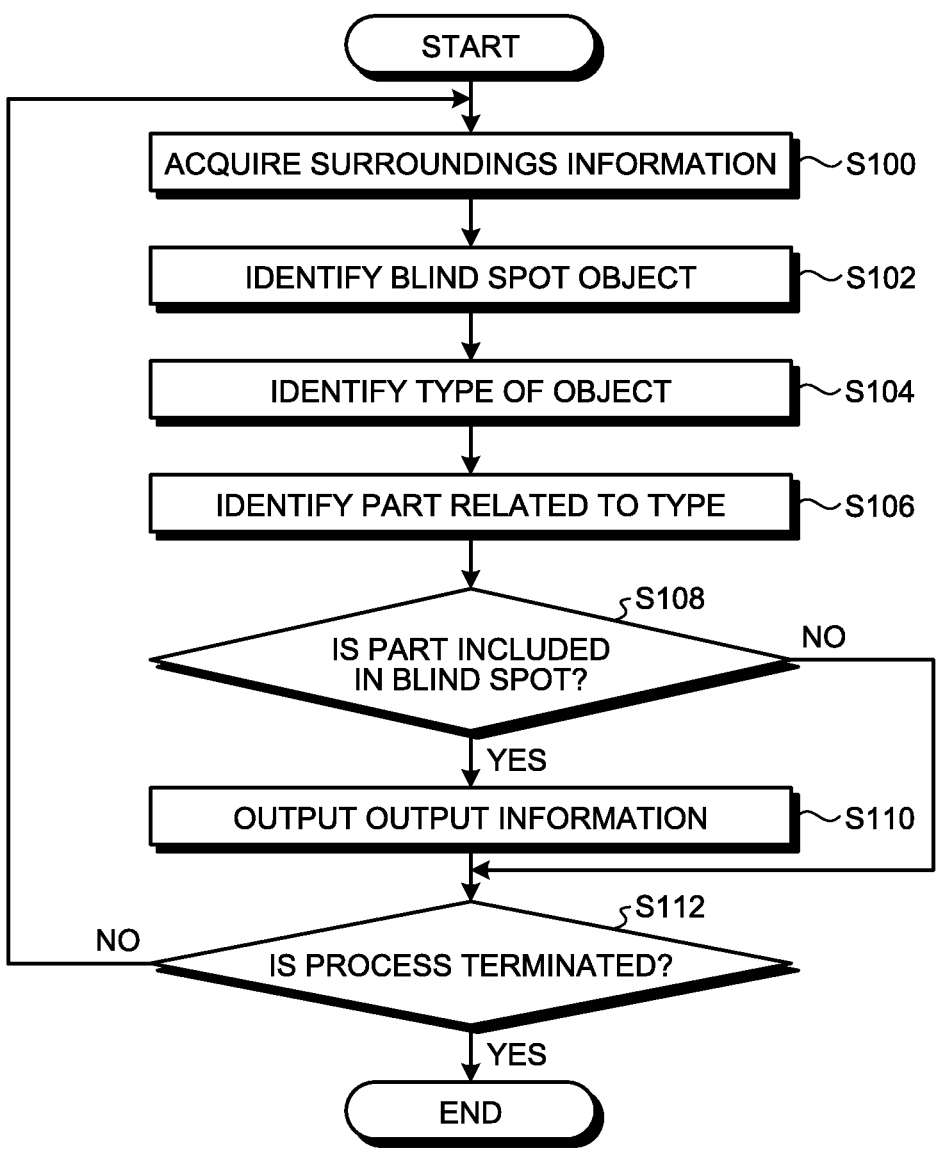
FIG. 6 is a flowchart illustrating an example of a procedure of a process executed by a processing circuit.

Next, a procedure of a process executed by the processing circuit 10A will be described. FIG. 6 is a flowchart illustrating an example of the procedure of the process executed by the processing circuit 10A.

First, the processing circuit 10A acquires surroundings information of the output-destination moving object 30 from the sensor 10G (Step S100). Next, the object identification function 10K identifies the occluded object 34 included in the blind spot 20A in a travelling environment of the output-destination moving object 30 based on the surroundings information (Step S102).

Next, the type identification function 10L identifies a type of the occluded object 34 identified in Step S102 (Step S104). Next, the determination function 10M identifies a part P related to the type identified in Step S104 from the parts management information 10J (Step S106).

Next, the determination function 10M determines whether the part P identified in Step S106 is included in the blind spot 20A of the output-destination moving object 30 (Step S108). When it is negatively determined in Step S108 (Step S108: No), the process proceeds to Step S112 described later.

When it is positively determined in Step S108 (Step S108: Yes), the process proceeds to Step S110. In Step S110, the output control function 10N controls the output circuit 10C to output output information (Step S110).

Next, the processing circuit 10A determines whether to terminate the process (Step S112). For example, the processing circuit 10A performs the determination in Step S112 by determining whether a signal indicating termination of the process has been input by an operation instruction of an input device 10H by the user.

When it is negatively determined in Step S112 (Step S112: No), the process returns to Step S100 described above. On the other hand, when it is positively determined in Step S112 (Step S112: Yes), this routine is terminated.

As described above, the information processing apparatus 10 of the embodiment includes the determination function 10M and the output control function 10N. The determination function 10M determines whether the particular part P related to the type of the object is included in the blind spot 20A of the object of interest (output-destination moving object 30). The output control function 10N outputs output information when it is determined that the part P is included in the blind spot 20A.

As described above, the information processing apparatus 10 of the embodiment outputs output information when the particular part P is included in the blind spot 20A of the object of interest.

Accordingly, the information processing apparatus 10 of the embodiment can appropriately output information of the blind spot 20A.

The information processing apparatus 10 of the embodiment outputs output information by determining whether the part P is included in the blind spot 20A. Therefore, in addition to the above effect, the information processing apparatus 10 can output output information with a smaller processing load and at a higher speed. Accordingly, the information processing apparatus 10 can appropriately output information of the blind spot 20A even when the output-destination moving object 30 travels at a higher speed.

The information processing apparatus 10 of the embodiment can call attention of the output-destination moving object 30 to travelling by outputting output information.

In the information processing apparatus 10 of the embodiment, the determination function 10M determines whether the part P related to the type of the object (occluded object 34) included in the blind spot 20A is included in the blind spot 20A. Therefore, in addition to the above effect, the information processing apparatus 10 of the embodiment can output more appropriate information regarding the blind spot 20A.

In the information processing apparatus 10 of the embodiment, the determination function 10M determines whether the part P is included in the blind spot 20A in the object (occluded object 34) based on the visible region 20B outside the blind spot 20A in the object (occluded object 34). Therefore, in addition to the above effect, the information processing apparatus 10 of the embodiment can appropriately output information of the blind spot 20A with a simple configuration at a higher speed.

Second Embodiment

Figure 7:
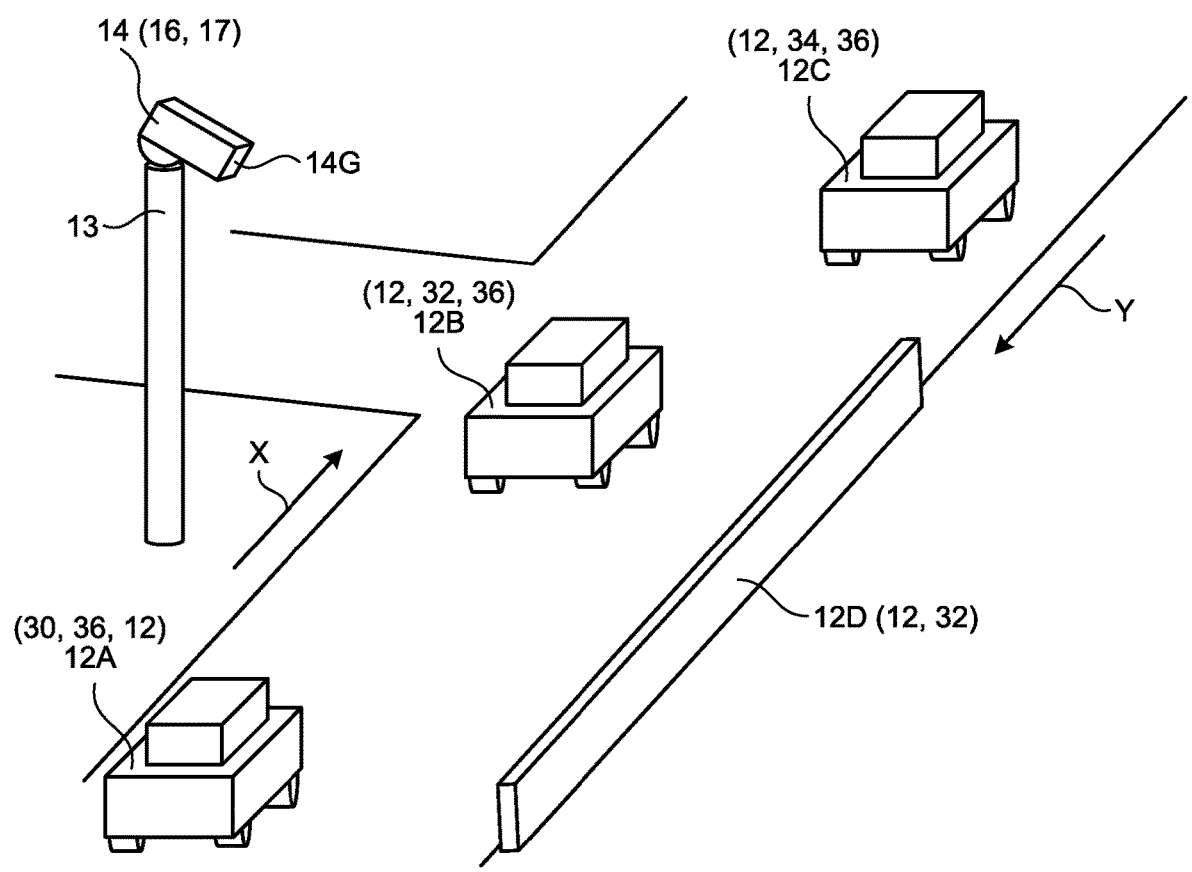
FIG. 7 is a schematic diagram illustrating an example of usage of an information processing apparatus according to a second embodiment.

FIG. 7 is a schematic diagram illustrating an example of usage of an information processing apparatus 14 according to an embodiment. In the embodiment, a mode will be described in which the information processing apparatus 14 is disposed at a different place than that of an output-destination moving object 30.

The information processing apparatus 14 of the embodiment is disposed, for example, at a position where surroundings information of the output-destination moving object 30 can be acquired. For example, the information processing apparatus 14 is mounted on an external apparatus 13. The external apparatus 13 is an apparatus configured as a separate apparatus from the output-destination moving object 30. The external apparatus 13 is disposed at a position where an image of a travel area of the output-destination moving object 30 can be captured. The external apparatus 13 is disposed to be fixed to the ground.

Therefore, in the embodiment, the information processing apparatus 14 obtains surroundings information including objects 12 such as the output-destination moving object 30 and other vehicles. Then, the information processing apparatus 14 selects the output-destination moving object 30 from the objects 12 included in the surroundings information of the output-destination moving object 30. Then, the information processing apparatus 14 outputs output information when a particular part P is included in a blind spot 20A of the selected output-destination moving object 30.

Figure 8:
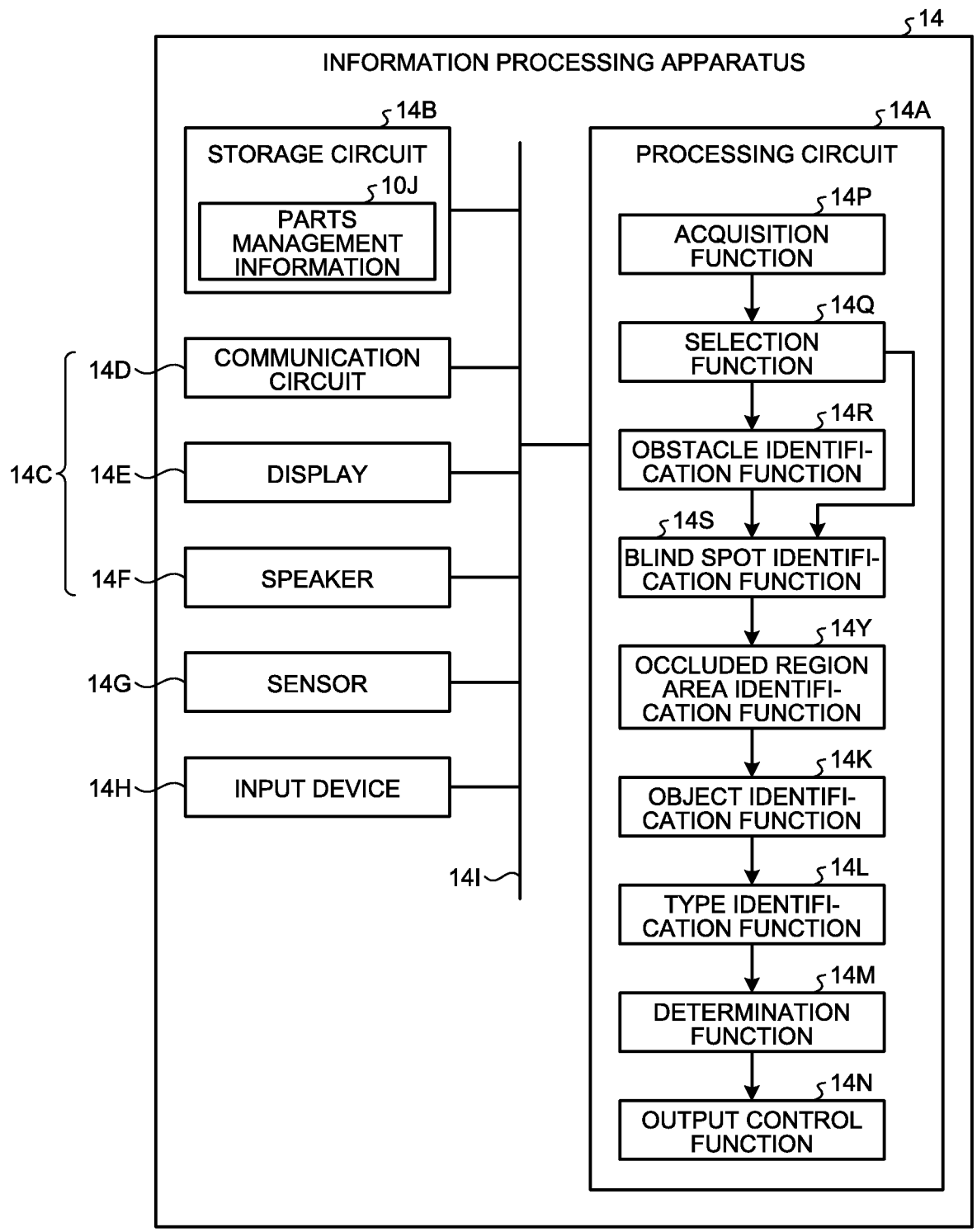
FIG. 8 is a block diagram illustrating an example of a configuration of the information processing apparatus.

Next, a configuration of the information processing apparatus 14 will be described in detail. FIG. 8 is a block diagram illustrating an example of the configuration of the information processing apparatus 14.

The information processing apparatus 14 outputs output information in accordance with an object (occluded object 34) included in the blind spot 20A of the output-destination moving object 30. The information processing apparatus 14 is, for example, a dedicated or general-purpose computer. The information processing apparatus 14 includes a processing circuit 14A, a storage circuit 14B, an output circuit 14C, a sensor 14G, and an input device 14H.

The processing circuit 14A, the storage circuit 14B, the output circuit 14C, the sensor 14G, and the input device 14H are connected through a bus 141. The storage circuit 14B, the output circuit 14C, the sensor 14G, and the input device 14H may be connected to the processing circuit 14A by wire or wirelessly. At least one of the storage circuit 14B, the output circuit 14C, the sensor 14G, and the input device 14H may be connected to the processing circuit 14A through a network.

The output circuit 14C (a communication circuit 14D, a display 14E, and a speaker 14F), the sensor 14G, and the input device 14H are similar to the output circuit 10C (the communication circuit 10D, the display 10E, and the speaker 10F), the sensor 10G, and the input device 10H in the first embodiment, respectively, except that they are mounted on the information processing apparatus 14.

The sensor 14G senses surroundings information as with the sensor 10G of the first embodiment. In the embodiment, the sensor 14G is disposed in the external apparatus 13. Therefore, the sensor 14G is disposed at a position where a plurality of objects 12 including the output-destination moving object 30 can be sensed from the outside of the output-destination moving object 30.

A specific description will be given using FIG. 7. A case where the sensor 14G is an image capturing apparatus will be described as an example. In the example illustrated in FIG. 7, the sensor 14G obtains a captured image including the plurality of objects 12 (vehicles 12A to 12C, and a stationary object 12D) by image capturing. In other words, the sensor 14G obtains the captured image as surroundings information. The processing circuit 14A performs a process described later using the surroundings information (captured image).

The sensor 14G may use a captured image obtained by image capturing of a particular area as the surroundings information. The sensor 14G may use captured images obtained by image capturing apparatuses as the surroundings information.

Referring back to FIG. 8, the description will be continued. In the information processing apparatus 14, at least one of the sensor 14G, the communication circuit 14D, the display 14E, and the speaker 14F may be configured separately from the information processing apparatus 14. In that case, the information processing apparatus 14 may perform wireless communication with each of the sensor 14G, the communication circuit 14D, the display 14E, and the speaker 14F configured separately therefrom.

The storage circuit 14B stores a program for executing a function of the processing circuit 14A instead of the program for executing the function of the processing circuit 10A (see FIG. 3) of the first embodiment. The storage circuit 14B is similar to the storage circuit 10B (see FIG. 3) of the first embodiment except the above point. The storage circuit 14B stores parts management information 10J in a manner similar to that of the storage circuit 10B of the first embodiment (see FIG. 4).

Next, the processing circuit 14A will be described. The processing circuit 14A includes an acquisition function 14P, a selection function 14Q, an obstacle identification function 14R, a blind spot identification function 14S, an object identification function 14K, an occluded region identification function 14Y, a type identification function 14L, a determination function 14M, and an output control function 14N.

Each of the processing functions in the processing circuit 14A is stored in the storage circuit 14B in a form of a computer-executable program. The processing circuit 14A is a processor which reads a program from the storage circuit 14B and executes the program, thereby realizing a function corresponding to each program.

The processing circuit 14A which has read each program has each function illustrated in the processing circuit 14A in FIG. 8. In FIG. 8, the single processing circuit 14A realizes the acquisition function 14P, the selection function 14Q, the obstacle identification function 14R, the blind spot identification function 14S, the object identification function 14K, the occluded region identification function 14Y, the type identification function 14L, the determination function 14M, and the output control function 14N.

The processing circuit 14A may be configured by combining a plurality of independent processors for realizing the respective functions. In that case, the processors execute programs, respectively, thereby realizing respective functions. There may be a case where each processing function is configured as a program, and one processing circuit executes each program, or a case where a specific function is implemented in a dedicated independent program execution circuit.

In the embodiment, the processor reads and executes the program stored in the storage circuit 14B, thereby realizing each of the above functions. A configuration may be employed in which a program is directly incorporated into a circuit of the processor instead that the program is stored in the storage circuit 14B. In that case, the processor reads and executes the program incorporated into the circuit, thereby realizing the function.

The acquisition function 14P is an example of an acquisition unit. The acquisition function 14P acquires surroundings information from the sensor 14G. The acquisition function 14P acquires position information of the output-destination moving object 30. In the embodiment, by analyzing surroundings information acquired from the sensor 14G, the acquisition function 14P acquires position information indicating respective positions of moving objects which are movable objects 12 among objects 12 indicated by the surroundings information. Consequently, the acquisition function 14P acquires position information of the moving objects including the output-destination moving object 30.

Figure 9:
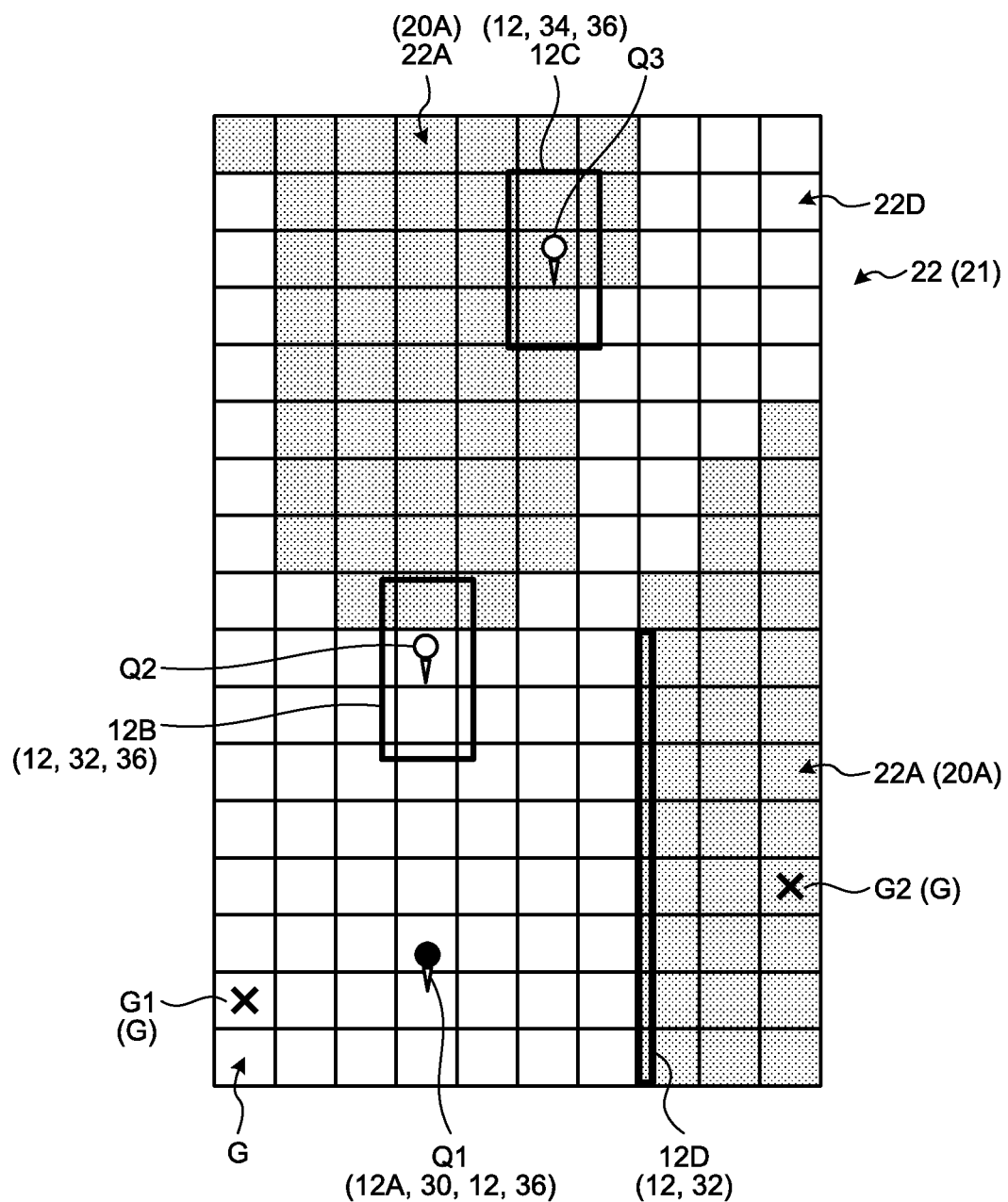
FIG. 9 is a diagram illustrating an example of a two-dimensional map.

FIG. 9 is an example of a two-dimensional map 22 in which surroundings information sensed by the sensor 14G is mapped in a horizontal plane. FIG. 9 illustrates a case where the surroundings information is a captured image.

First, the acquisition function 14P detects a moving object 36 which is a movable object 12 among objects 12 included in a captured image 21. In the example illustrated in FIG. 9, the acquisition function 14P detects, among the objects 12 (the vehicles 12A, 12B, and 12C, and the stationary object 12D) included in the captured image 21, the vehicles 12A, 12B, and 12C as the moving object 36 (see also FIG. 7).

The acquisition function 14P may detect the moving object 36 using a known image processing method or the like. The acquisition function 14P extracts in advance feature descriptors, for example, from an image of an object such as a human or a vehicle. Then, the acquisition function 14P generates in advance an identifier from the feature descriptors. The acquisition function 14P may detect the moving object 36 included in the captured image 21 using the identifier.

The feature descriptors are, for example, histograms of oriented gradients (HoG), scale-invariant feature transform (SIFT), or the like. The identifier is, for example, a linear support vector machine (SVM).

The acquisition function 14P may detect the moving object 36 from the captured image 21 using other methods. For example, the acquisition function 14P may compare captured images 21 each captured at different image capturing timings, and detect, as the moving object 36, an area where a change in a luminance value is equal to or greater than a threshold. Alternatively, the acquisition function 14P may detect the moving object 36 by preparing an image of the moving object 36 as a template, and searching the captured image 21 using the template. The acquisition function 14P may detect a moving point in the captured image 21 by tracking a feature point in the captured image 21 by a known method. In that case, the acquisition function 14P may detect the moving point in the captured image 21 as the moving object 36.

Next, the acquisition function 14P acquires position information indicating a position of each moving object 36 included in the captured image 21.

When the information processing apparatus 14 is mounted on the external apparatus 13 of which the position is fixed, a positional relationship between the ground and the sensor 14G is fixed. Therefore, the acquisition function 14P estimates height from a ground plane for a position of each pixel which constitutes the captured image 21 obtained by the sensor 14G, and makes the height correspond to a position on a map (absolute position). Then, the acquisition function 14P may identify the absolute position corresponding to the position of the moving object 36 in the captured image 21, and acquire the identified absolute position as the position information of the moving object 36.

The acquisition function 14P is not limited to a mode in which the absolute position is used as the position information of the moving object 36. For example, the acquisition function 14P may use, as the position information of the moving object 36, a relative position employing a particular position as a reference. The particular position as a reference is, for example, a position of the external apparatus 13 including the information processing apparatus 14 mounted thereon.

If the sensor 14G is a millimeter-wave radar or a laser sensor, the surroundings information is distance information. In that case, the acquisition function 14P may acquire the moving object 36 and the position information of the moving object 36 using a known method from a three-dimensional point group indicated by the distance information.

Alternatively, the acquisition function 14P may acquire, from each moving object 36 included in the captured image 21 through wireless communication, the position information indicating a position of each moving object 36. Alternatively, the acquisition function 14P may acquire the position information of each moving object 36 included in the captured image 21 from a known transportation system or the like.

Consequently, the acquisition function 14P acquires the position information of each of the moving objects 36 (the vehicles 12A, 12B, and 12C) included in the captured image 21. In the example illustrated in FIG. 9, the acquisition function 14P acquires the position information indicating each of positions (positions Q1, Q2, and Q3) of each of the moving objects 36 (the vehicles 12A, 12B, and 12C).

Next, the selection function 14Q will be described. The selection function 14Q selects one of the moving objects 36 included in the captured image 21 as the output-destination moving object 30.

The selection function 14Q selects one of the moving objects 36 included in the captured image 21 in accordance with a predetermined rule. Examples of the rule include a moving object 36 having the shortest distance from the information processing apparatus 14, a moving object 36 having the longest distance from the information processing apparatus 14, a moving object 36 having the shortest distance from a predetermined object such as a traffic light. The examples of the rule are not limited thereto.

In the embodiment, a case will be described in which the selection function 14Q selects, among moving objects 36 (the vehicles 12A, 12B, and 12C) included in the captured image 21, the vehicle 12A as the output-destination moving object 30.

The obstacle identification function 14R identifies an obstacle 32 which occludes a view of the output-destination moving object 30. A description will be given using FIG. 9. For example, the obstacle identification function 14R uses, as a viewpoint, the position Q1 of the output-destination moving object 30 (vehicle 12A) in the two-dimensional map 22. Then, the obstacle identification function 14R identifies, as the obstacle 32, another object 12 positioned nearest from the position Q1 in each of all directions of 360° centered around the position Q1 in the two-dimensional map 22. The other object 12 is an object 12 other than the output-destination moving object 30.

In the examples illustrated in FIGS. 7 and 9, respectively, the obstacle identification function 14R identifies, among the objects 12 included in the two-dimensional map 22, the vehicle 12B and the stationary object 12D as the obstacle 32.

In the embodiment, the obstacle identification function 14R may identify, as the obstacle 32, another object 12 which is present on the outside of the output-destination moving object 30 and satisfies the above conditions. When the output-destination moving object 30 is the vehicle 12A, the outside of the output-destination moving object 30 is, for example, outside of the vehicle. Therefore, in that case, a member such as an A pillar which constitutes the output-destination moving object 30 is not identified as the obstacle 32.

The obstacle identification function 14R may identify the obstacle 32 by using, as the viewpoint, a position of a driver who drives the output-destination moving object 30. In that case, the obstacle identification function 14R identifies, as the obstacle 32, a member such as an A pillar which constitutes the output-destination moving object 30 and the other object 12 which is present on the outside of the output-destination moving object 30 and satisfies the above conditions. In that case, the obstacle identification function 14R identifies, for example, an A pillar mounted on the output-destination moving object 30, the vehicle 12B, and the stationary object 12D as the obstacle 32 which occludes the view.

By the obstacle identification function 14R identifying, as the obstacle 32, at least a part of members which constitute the output-destination moving object 30, the information processing apparatus 14 can perform notification of information of the blind spot 20A more appropriately.

The obstacle identification function 14R may identify the obstacle 32 from map information including the position Q1 of the output-destination moving object 30 while using the position Q1 of the output-destination moving object 30 as the viewpoint. The map information may be acquired from an external apparatus or the like which distributes map data.

Then, the obstacle identification function 14R outputs the position or the shape of the identified obstacle 32 to the blind spot identification function 14S. As the position of the obstacle 32, an absolute position may be used, or a relative position may be used.

Referring back to FIG. 8, the description will be continued. The blind spot identification function 14S is an example of a blind spot identification unit. In the embodiment, the blind spot identification function 14S identifies the blind spot 20A in a environment where the output-destination moving object 30 moves based on the surroundings information and the position information of the output-destination moving object 30.

The blind spot identification function 14S identifies the blind spot 20A generated by the obstacle 32 when using the position Q1 of the output-destination moving object 30 as the viewpoint. The position Q1 of the output-destination moving object 30 is a position indicated by the position information of the output-destination moving object 30.

The identification method of the blind spot 20A will be specifically described. FIG. 9 is a diagram for explaining identification of the blind spot 20A. For example, the blind spot identification function 14S identifies the blind spot 20A using the two-dimensional map 22 of the captured image 21.

In detail, the blind spot identification function 14S divides the two-dimensional map 22 into grids G. Each cell of the grids G has the same size. Then, the blind spot identification function 14S identifies, among the grids G included in the two-dimensional map 22, a grid G in a blind spot area 22A when a line connecting the position Q1 of the output-destination moving object 30 and the grid G passes through the obstacle 32.

For example, in the example illustrated in FIG. 9, a line connecting a grid G1 and the position Q1 does not pass through the obstacle 32. Therefore, the grid G1 is located outside the blind spot area 22A (in other words, a visible area 22D). On the other hand, a line connecting a grid G2 and the position Q1 passes through the obstacle 32. Therefore, the grid G2 is located in the blind spot area 22A.

Then, the blind spot identification function 14S identifies, as the blind spot 20A, an area consisting of grids G in the blind spot area 22A in the two-dimensional map 22.

The blind spot identification function 14S may identify the blind spot 20A using a method different from the above method. For example, the blind spot identification function 14S identifies, among the grids G in the two-dimensional map 22, a grid G located on the opposite side of the position Q1 of the output-destination moving object 30 with respect to the obstacle 32, as a grid G in the blind spot area 22A. Then, an area consisting of the grids G in the blind spot area 22A may be identified as the blind spot 20A.

The blind spot identification function 14S may sequentially examine whether, among the grids G in the two-dimensional map 22, a grid G adjacent to another grid G including the obstacle 32 constitutes the blind spot area 22A. Then the blind spot 20A may be identified by this examination.

The grids G in the two-dimensional map 22 may have the same size, or may have different sizes from each other. The blind spot identification function 14S may identify the blind spot 20A using two-dimensional maps in which the captured image 21 is mapped on two-dimensional maps 22 having different heights from a ground surface.

The blind spot identification function 14S may identify the blind spot 20A using a three-dimensional map instead of the two-dimensional map 22. In that case, the obstacle identification function 14R identifies a obstacle 32 having a three-dimensional shape. Then, the blind spot identification function 14S may identify a three-dimensional area as the blind spot 20A using the three-dimensional map and the obstacle 32 having a three-dimensional shape. The blind spot identification function 14S may indicate the blind spot 20A with a direction and distance with respect to the position Q1 of the output-destination moving object 30 as a reference.

The blind spot identification function 14S has identified the blind spot 20A using the position Q1 of the output-destination moving object 30 as the viewpoint. However, the blind spot identification function 14S may identify the blind spot 20A using a viewpoint of the driver of the output-destination moving object 30, and at least one of the position Q1 of the output-destination moving object 30 and a position where the sensor 14G is disposed, as a viewpoint. In other words, the blind spot identification function 14S may identify the blind spot 20A using, as viewpoints, positions regarding the output-destination moving object 30. The blind spot identification function 14S may identify the blind spot 20A using the position where the sensor 14G is disposed as a viewpoint.

Referring back to FIG. 8, the description will be continued. The object identification function 14K is an example of an object identification unit. The object identification function 14K identifies the occluded object 34 included in the blind spot 20A.

Figure 10A:
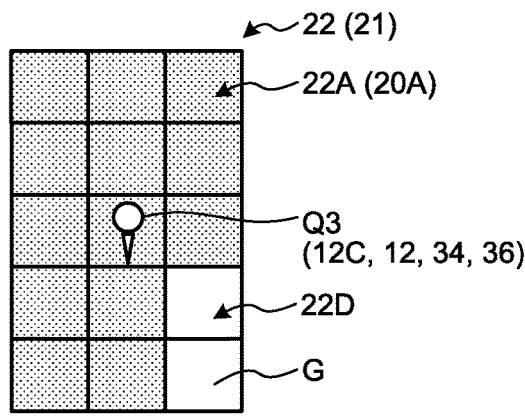
FIGS. 10A and 10B are diagrams for explaining identification of an occluded object.
Figure 10B:
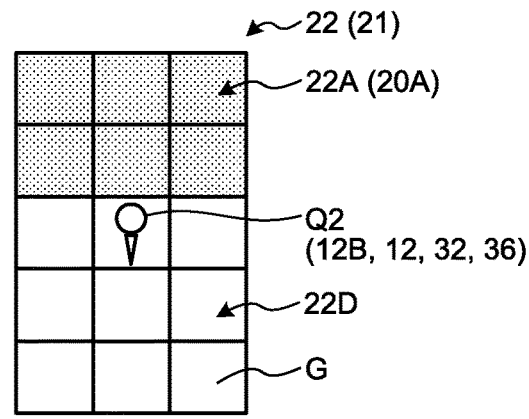

FIGS. 10A and 10B are diagrams for explaining identification of the occluded object 34. For example, first, the object identification function 14K identifies, among the grids G in the two-dimensional map 22, grids G respectively corresponding to positions of the objects 12 other than the output-destination moving object 30 (vehicle 12A). Then, the object identification function 14K determines whether the identified grids G are included in the blind spot area 22A of the blind spot 20A identified by the blind spot identification function 14S. When any of the grids G respectively corresponding to the positions of the objects 12 is included in the blind spot area 22A, the object identification function 14K identifies the corresponding object 12 as the occluded object 34.

Specifically, a position Q3 of the vehicle 12C is located in the blind spot area 22A as illustrated in FIG. 10A. Therefore, the blind spot identification function 14S identifies the vehicle 12C as the occluded object 34. On the other hand, a position Q2 of the vehicle 12B is located outside the blind spot area 22A (in other words, the visible area 22D) as illustrated in FIG. 10B. Therefore, the blind spot identification function 14S does not identify the vehicle 12B as the occluded object 34.

As described above, the object identification function 14K identifies the occluded object 34. In the examples illustrated in FIGS. 9, 10A, and 10B, the object identification function 14K identifies the vehicle 12C as the occluded object 34.

The identification method of the occluded object 34 is not limited to the above method. For example, the object identification function 14K may identify, among the objects 12 other than the output-destination moving object 30 included in the two-dimensional map 22, an object 12 of which a ratio included in the blind spot area 22A is equal to or greater than a threshold as the occluded object 34. Alternatively, the object identification function 14K may identify, among the objects 12 other than the output-destination moving object 30 included in the two-dimensional map 22, an object 12 at least a part of which is included in the blind spot area 22A as the occluded object 34.

In that case, the object identification function 14K identifies respective shapes of the objects 12 other than the output-destination moving object 30 included in the two-dimensional map 22. Then, the object identification function 14K may use ranges indicated by the identified shapes as ranges occupied by the objects 12, respectively. Then, an object 12 at least a part of the range thereof is included in the blind spot 20A may be identified as the occluded object 34.

Regarding the shapes of the objects 12, an approximate graphic, a model such as a CG model, or a point group acquired in advance by observation may be used.

Referring back to FIG. 8, the occluded region identification function 14Y will be described. The occluded region identification function 14Y identifies the blind spot 20A of the output-destination moving object 30 in the occluded object 34. In other words, the occluded region identification function 14Y identifies an occluded region 22C which is a region of the occluded object 34 in the blind spot 20A. The occluded object 34 is the object 12 identified by the object identification function 14K. The occluded region identification function 14Y identifies the blind spot 20A of the output-destination moving object 30 in the occluded object 34 by identifying the occluded region 22C.

Figure 11A:
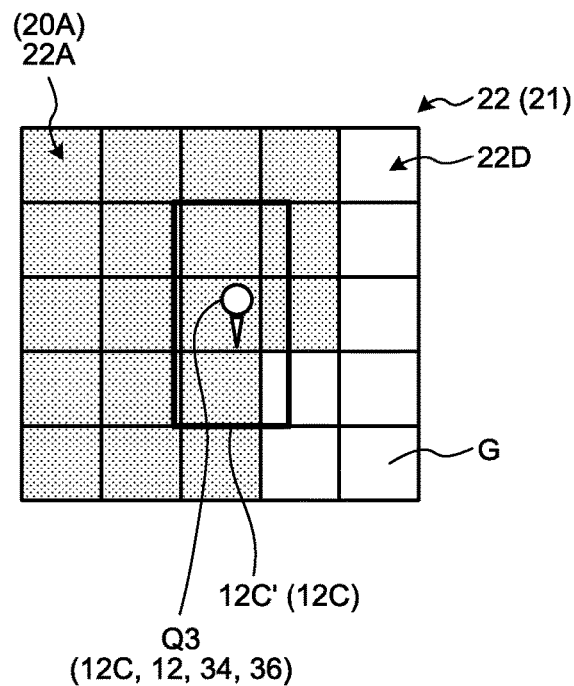
FIGS. 11A and 11B are diagrams for explaining identification of an occluded region.
Figure 11B:
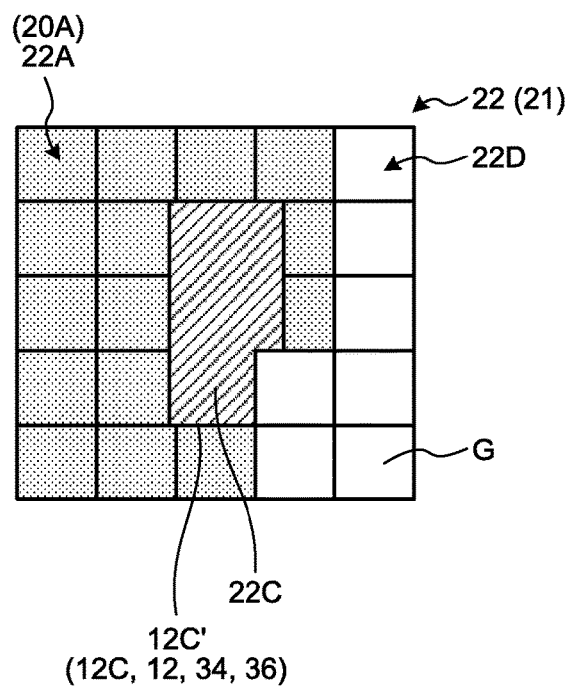

FIGS. 11A and 11B are diagrams for explaining identification of the occluded region 22C. For example, the occluded region identification function 14Y acquires an area 12C' of the vehicle 12C as the occluded object 34 (see FIG. 11A). The area 12C' of the vehicle 12C is an area inside a continuous line indicating a shape of the vehicle 12C. Then, the occluded region identification function 14Y identifies, as the occluded region 22C, an area overlapping the blind spot area 22A in the area 12C' of the vehicle 12C (see FIG. 11B).

In detail, the occluded region identification function 14Y acquires, among the grids G in the two-dimensional map 22, grids G in the blind spot area 22A from the blind spot identification function 14S. Then, the occluded region identification function 14Y may identify an area overlapping the area 12C' of the vehicle 12C in each of the grids G in the blind spot area 22A as the occluded region 22C.

The occluded region identification function 14Y may divide the vehicle 12C into regions for each predetermined interval or each unit of components which constitute the vehicle 12C. Then, the occluded region identification function 14Y may identify, among the regions, a region overlapping the blind spot area 22A as the occluded region 22C in the vehicle 12C.

Then, the occluded region identification function 14Y identifies the blind spot 20A of the output-destination moving object 30 in the occluded object 34 by identifying the occluded region 22C of the occluded object 34 (vehicle 12C).

Referring back to FIG. 8, the type identification function 14L will be described. The type identification function 14L is an example of a type identification unit. The type identification function 14L identifies a type of the occluded object 34 identified by the object identification function 14K. The type identification function 14L may identify the type of the occluded object 34 in a manner similar to that of the type identification function 10L of the first embodiment. For example, when the occluded object 34 is the vehicle 12C, the type identification function 14L identifies the type "vehicle".

Next, the determination function 14M will be described. The determination function 14M is an example of a determination unit. The determination function 14M determines whether the particular part P related to the type of the occluded object 34 is included in the blind spot 20A of the output-destination moving object 30 in a manner similar to that of the determination function 10M of the first embodiment.

In the embodiment, the determination function 14M identifies the part P related to the type identified by the type identification function 14L from the parts management information 10J. Then, the determination function 14M determines whether the identified part P is included in the occluded region 22C of the occluded object 34. In accordance therewith, the determination function 14M determines whether the part P is included in the blind spot 20A of the output-destination moving object 30 in the occluded object 34.

For example, the determination function 14M stores in advance a type of an object, a feature (such as a shape and a color) of each of parts P included in the object, and a position of each of the parts P in the object correspondingly to one another. Then, the determination function 14M performs an image analysis of the occluded region 22C in the occluded object 34, and when an area which consistent with the feature of the part P realted to the type identified by the type identification function 14L is included, determines that the part P is included in the occluded region 22C.

The determination function 14M may determine that the part P is included in the occluded region 22C when a position related to the identified part P is located in the occluded region 22C of the occluded object 34.

Figure 12A:
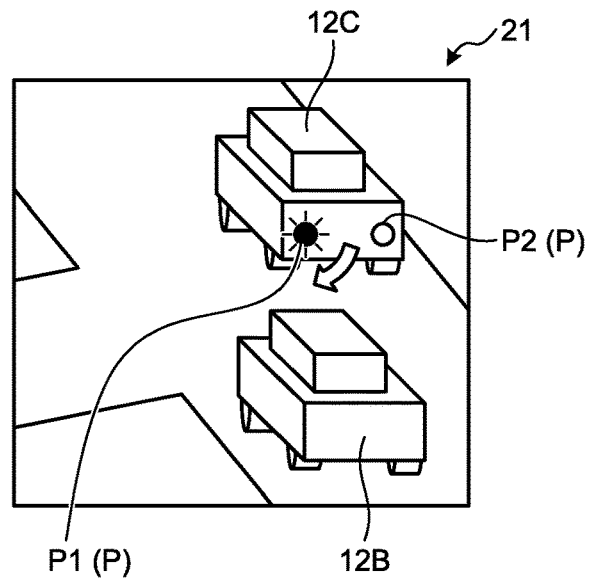
FIGS. 12A and 12B are diagrams for explaining determination by a determination function.
Figure 12B:
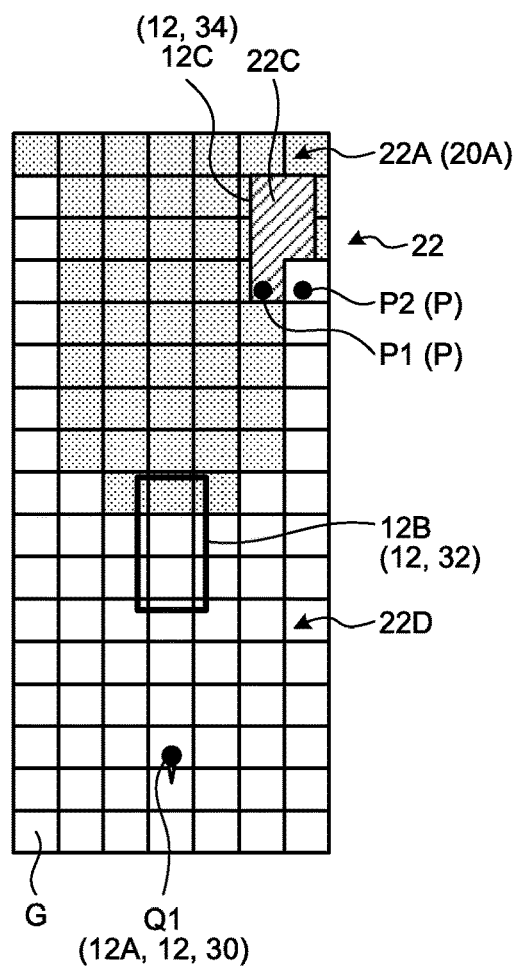

FIGS. 12A, 12B, 13A, and 13B are diagrams for explaining determination by the determination function 14M. FIGS. 12A and 12B are diagrams for explaining a case where the particular part P is included in the occluded region 22C.

For example, it is assumed that the sensor 14G has acquired, as surroundings information, the captured image 21 captured from the external apparatus 13 (see FIG. 12A). In that case, the processing circuit 14A determines, using the two-dimensional map 22 corresponding to the captured image captured from the external apparatus 13 (see FIG. 12B), whether a part P related to the type of the occluded object 34 (vehicle 12C) is included in the occluded region 22C which is the blind spot area 22A using the position Q1 of the output-destination moving object 30 (vehicle 12A) as the viewpoint.

In the example illustrated in FIGS. 12A and 12B, a direction indicator P1 of the vehicle 12C which is the occluded object 34 is included in the blind spot 20A using the vehicle 12B as the obstacle 32. In detail, the direction indicator P1 is included in the occluded region 22C in the vehicle 12C. Therefore, in that case, the determination function 14M determines that the part P (here, the direction indicator P1) is included in the blind spot 20A.

Figure 13A:
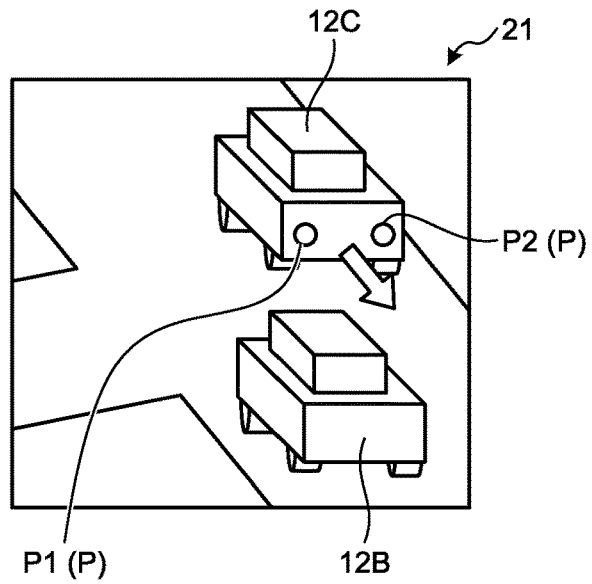
FIGS. 13A and 13B are diagrams for explaining determination by the determination function.
Figure 13B:
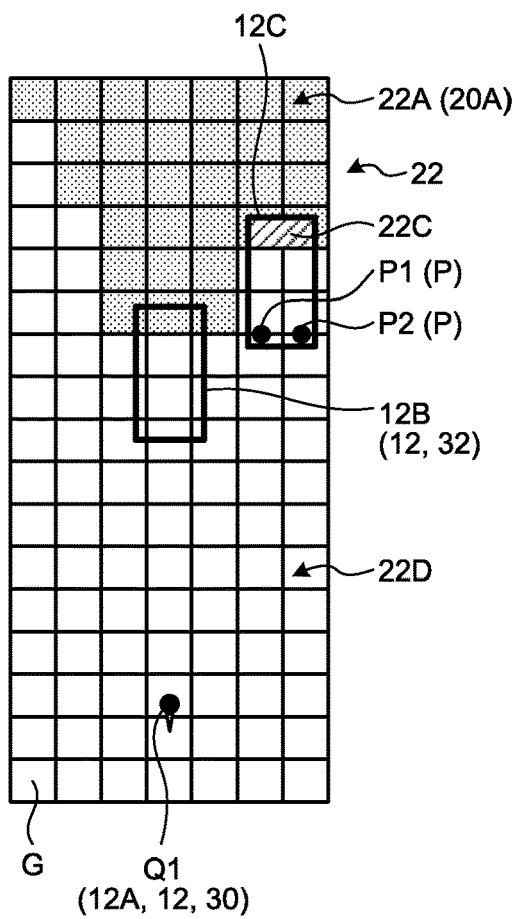

FIGS. 13A and 13B are diagrams for explaining a case where the part P is not included in the blind spot 20A. For example, it is assumed that the sensor 14G has acquired, as surroundings information, the captured image 21 captured from the external apparatus 13 (see FIG. 13A). In that case, the processing circuit 14A identifies an object included in the blind spot area 22A of the vehicle 12A using the two-dimensional map 22 corresponding to the captured image captured from the external apparatus 13 (see FIG. 13B). In the example illustrated in FIGS. 13A and 13B, the vehicle 12C is included in the blind spot area 22A. Then, the part P of the vehicle 12C which is the occluded object 34 is not included in the blind spot area 22A. In other words, the part P is not included in the occluded region 22C in the vehicle 12C. Therefore, in that case, the processing circuit 14A determines that the part P is not included in the blind spot 20A.

Referring back to FIG. 8, the description will be continued. The output control function 14N outputs output information when it is determined that the part P is included in the blind spot 20A. The output information is similar to that in the first embodiment. The process of the output control function 14N is similar to that of the output control function 10N.

Figure 14:
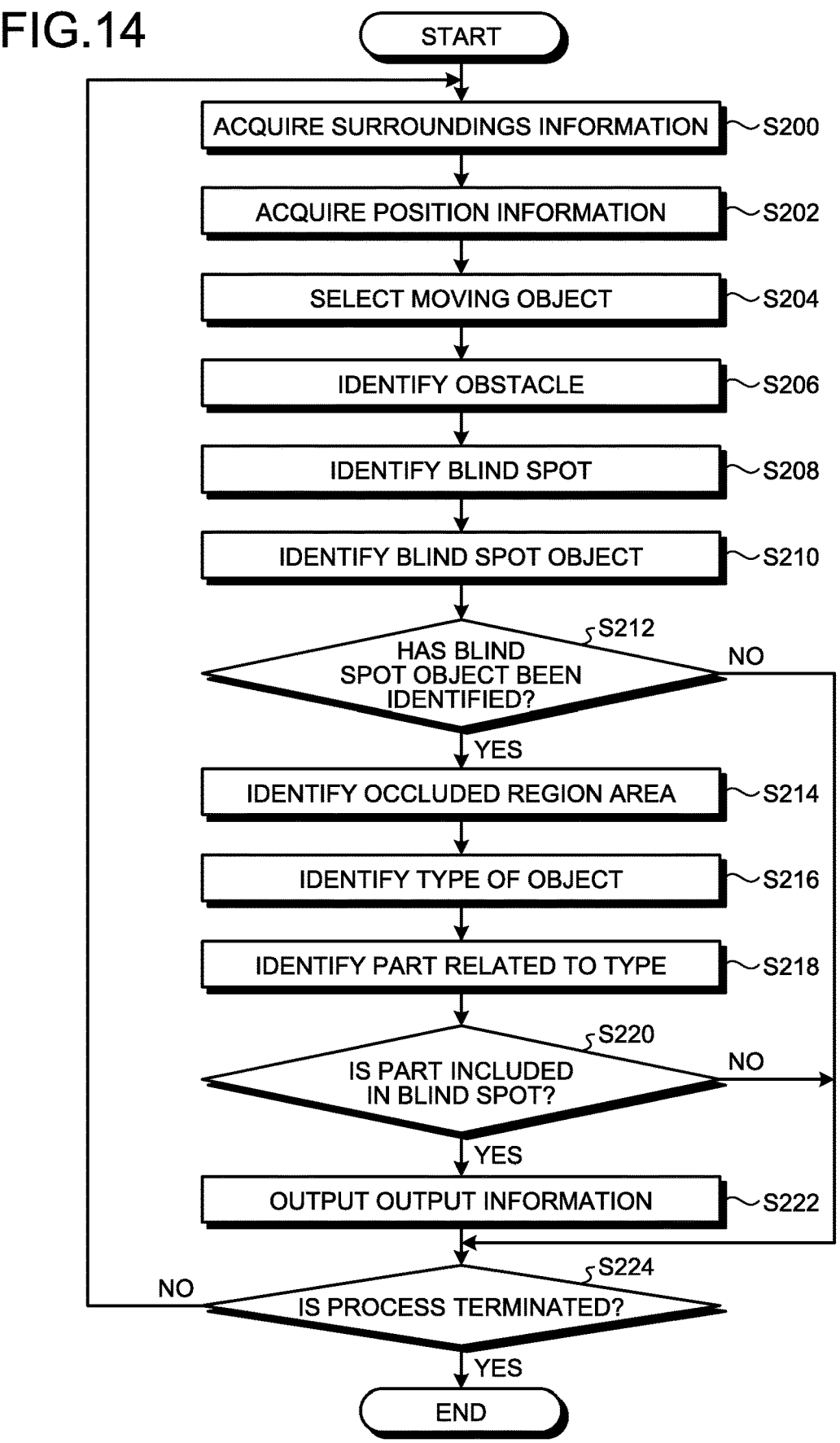
FIG. 14 is a flowchart illustrating an example of a procedure of a process executed by a processing circuit.

Next, a procedure of a process executed by the processing circuit 14A will be described. FIG. 14 is a flowchart illustrating an example of the procedure of the process executed by the processing circuit 14A.

First, the acquisition function 14P acquires surroundings information from the sensor 14G (Step S200). Next, the acquisition function 14P acquires position information of each of the moving objects 36 (the vehicles 12A, 12B, and 12C) included in the surroundings information (Step S202).

Next, the selection function 14Q selects one of the moving objects 36 included in the surroundings information acquired in Step S200 as the output-destination moving object 30 (Step S204). Here, similarly to the above, a description will be given based on an assumption that the vehicle 12A has been selected as the output-destination moving object 30.

Next, the obstacle identification function 14R identifies the obstacle 32 which occludes a view of surroundings of the output-destination moving object 30 (vehicle 12A) (Step S206). For example, the obstacle identification function 14R identifies the vehicles 12B and 12C, and the stationary object 12D as the obstacle 32.

Next, the blind spot identification function 14S identifies the blind spot 20A in a travelling environment of the output-destination moving object 30 based on the surroundings information acquired in Step S200 and the position information of the output-destination moving object 30 (Step S208).

Next, the object identification function 14K identifies an object 12 (occluded object 34) included in the blind spot 20A identified in Step S208 (Step S210).

Next, the object identification function 14K determines whether the occluded object 34 has been identified (Step S212). When the occluded object 34 has not been identified (Step S212: No), the process proceeds to Step S224. On the other hand, when the occluded object 34 has been identified (Step S212: Yes), the process proceeds to Step S214.

In Step S214, the occluded region identification function 14Y identifies the occluded region 22C in the occluded object 34 (vehicle 12C) identified in Step S210 (Step S214).

Next, the type identification function 14L identifies a type of the occluded object 34 identified in Step S210 (Step S216). Next, the determination function 14M identifies a part P related to the type identified in Step S216 from the parts management information 10J (Step S218).

Next, the determination function 14M determines whether the part P identified in Step S216 is included in the blind spot 20A (Step S220). When it is negatively determined in Step S220 (Step S220: No), the process proceeds to Step S224 described later.

When it is positively determined in Step S220 (Step S220: Yes), the process proceeds to Step S222. In Step S222, the output control function 14N controls the output circuit 14C to output output information (Step S222).

Next, the processing circuit 14A determines whether to terminate the process (Step S224). For example, the processing circuit 14A performs the determination in Step S224 by determining whether a signal indicating termination of the process has been input by an operation instruction of an input device 14H by a user.

When it is negatively determined in Step S224 (Step S224: No), the process returns to Step S200 described above. On the other hand, when it is positively determined in Step S224 (Step S224: Yes), this routine is terminated.

As described above, the information processing apparatus 14 of the embodiment is mounted on the external apparatus 13 present outside the output-destination moving object 30. The information processing apparatus 14 of the embodiment obtains surroundings information including the output-destination moving object 30 and the objects 12 such as other vehicles as surroundings information of the output-destination moving object 30. Then, the information processing apparatus 14 selects the output-destination moving object 30 from the objects 12 included in the surroundings information of the output-destination moving object 30. Then, the information processing apparatus 14 outputs output information when a particular part P is included in a blind spot 20A of the selected output-destination moving object 30.

Therefore, the information processing apparatus 14 performs determination based on the sensor 14G capable of viewing inside the blind spot 20A, in addition to the effect of the information processing apparatus 10 of the first embodiment, and consequently, it is possible to improve determination accuracy of the part P in the blind spot 20A. Accordingly, the information processing apparatus 14 of the embodiment can output information of the inside of the blind spot 20A more appropriately.

In the embodiment, the mode has been described in which whenever the sensor 14G acquires surroundings information, the processing circuit 14A determines whether the part P is included in the blind spot 20A of the output-destination moving object 30, and outputs output information. However, when receiving request information indicating a process request from any of the moving objects 36, the processing circuit 14A may set the moving object 36 which is a source of the process request as the output-destination moving object 30, and determine whether the particular part P is included in the blind spot 20A of the output-destination moving object 30.

Examples of the request information include identification information of the moving object 36, position information indicating a current position of the moving object 36, and a signal indicating an acquisition request for information regarding the blind spot 20A.

For example, it is assumed that the vehicle 12A has transmitted the above request information to the information processing apparatus 14. In that case, a driver of the vehicle 12A which is the output-destination moving object 30 inputs an acquisition request for information regarding the blind spot 20A using an input device (for example, the input device 10H, see FIG. 3) provided in the vehicle 12A. In accordance therewith, the communication circuit 10D of the vehicle 12A transmits request information to the information processing apparatus 14. The processing circuit 14A of the information processing apparatus 14 may execute the above function when receiving the request information through the communication circuit 14D.

Then, the output control function 14N of the processing circuit 14A may output output information to the output-destination moving object 30.

In the embodiment, the mode has been described in which the information processing apparatus 14 is mounted on the external apparatus 13 present outside the output-destination moving object 30. However, the information processing apparatus 14 may be mounted on another vehicle (for example, the vehicle 12B) present outside the output-destination moving object 30.

Third Embodiment

Figure 15:
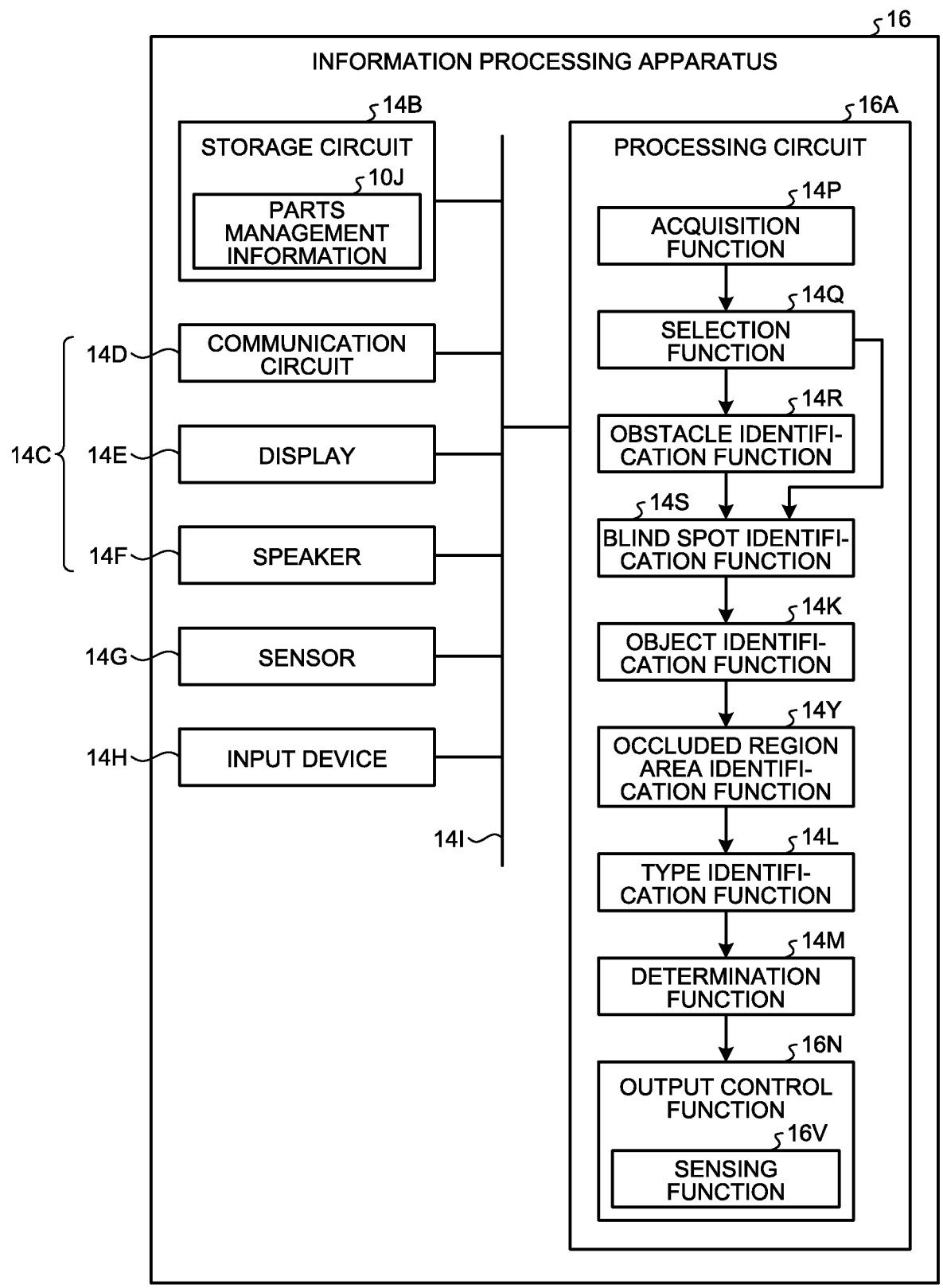
FIG. 15 is a block diagram illustrating an example of a configuration of an information processing apparatus according to a third embodiment.

FIG. 15 is a block diagram illustrating an example of a configuration of an information processing apparatus 16 of an embodiment. The information processing apparatus 16 of the embodiment outputs output information when state transition of a part P included in a blind spot 20A is sensed.

The information processing apparatus 16 outputs output information in a manner similar to the information processing apparatuses 10 and 14 of the above embodiments. The information processing apparatus 16 is, for example, a dedicated or general-purpose computer.

In the embodiment, a mode will be described in which the information processing apparatus 16 is mounted on an external apparatus 13 as that of the second embodiment. The information processing apparatus 16 may be mounted on an output-destination moving object 30 as that of the first embodiment.

The information processing apparatus 16 includes a processing circuit 16A, a storage circuit 14B, an output circuit 14C, a sensor 14G, and an input device 14H. The information processing apparatus 16 is similar to the information processing apparatus 14 of the second embodiment except that the processing circuit 16A is included therein instead of the processing circuit 14A.

The processing circuit 16A includes an acquisition function 14P, a selection function 14Q, an obstacle identification function 14R, a blind spot identification function 14S, an object identification function 14K, an occluded region identification function 14Y, a type identification function 14L, a determination function 14M, and an output control function 16N. The processing circuit 16A is similar to the processing circuit 14A except that the output control function 16N is included therein instead of the output control function 14N.

In a manner similar to that of the output control function 14N of the second embodiment, the output control function 16N outputs output information when it is determined that a part P is included in the blind spot 20A.

In the embodiment, the output control function 16N includes a sensing function 16V. The sensing function 16V senses state transition of the part P determined by the determination function 14M to be included in the blind spot 20A. Then, the output control function 16N outputs output information when it is determined that the part P is included in the blind spot 20A and the state transition of the part P is sensed.

The state transition refers to a change with time of at least one of a color of a part P, a shape of the part P, a light amount (in other words, a luminance value) of the part P, and a relative position of the part P with respect to the centroid of an occluded object 34.

For example, the light amount of a part P is changed by a transition from an illuminating state to a blinking state of the part P, or a change from the blinking state to the illuminating state thereof. In that case, the part P is, for example, a vehicle-mounted illuminating device such as a direction indicator.

The light amount or the color of a part P is changed, for example, by a transition in display content of the part P. In that case, the part P is, for example, a display mounted on the vehicle. The change in the shape or the relative position of a part P is caused by a change in a position of an arm or a face, which is a part P of a human, or a change in an orientation of the face.

For example, the sensing function 16V obtains a change with time in pixel values of a part P in the blind spot 20A in a captured image 21 as surroundings information acquired by the sensor 14G. Then, the sensing function 16V may sense the state transition of the part P when the change with time exceeds a threshold indicating a change in at least one of the color, the shape, and the light amount of the part P.

The sensing function 16V may sense the state transition of the part P using a feature descriptorlike histograms of oriented gradients (HOG), a three-dimensional point, a shape of a CG model, or the like.

Alternatively, the sensing function 16V may sense the state transition of the part P using captured images 21 captured at different times. In that case, the sensing function 16V may identify, as the same part P, parts P which exhibit similarity of the feature descriptors being equal to or greater than a threshold in the captured images 21 captured at different times. Then, the sensing function 16V may sense the state transition of the part P using pixel values of the same part P in the captured images 21.

The sensing function 16V may identify an image area indicating the same part P in each of the captured images 21 from a moving distance and a moving direction of the occluded object 34 including the part P, and use the identified image area for sensing the state transition of the part P.

Then, the output control function 16N outputs output information when it is determined by the determination function 14M that the part P is included in the blind spot 20A and the state transition of the part P is sensed.

Figure 16A:
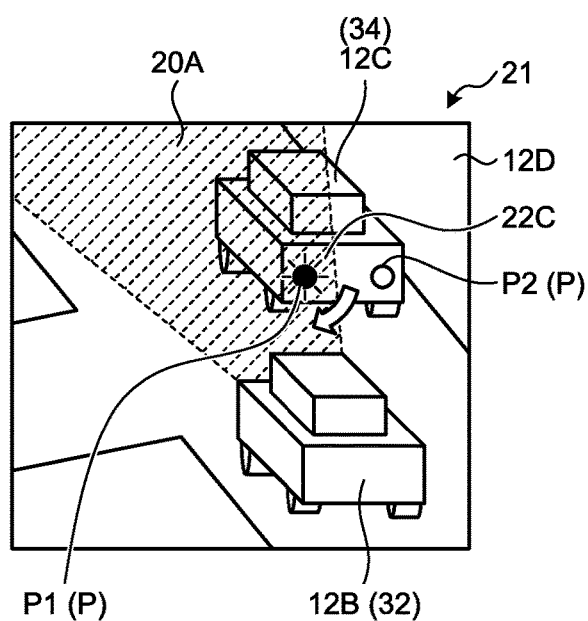
FIGS. 16A and 16B are diagrams for explaining sensing of transformation of a part.
Figure 16B:
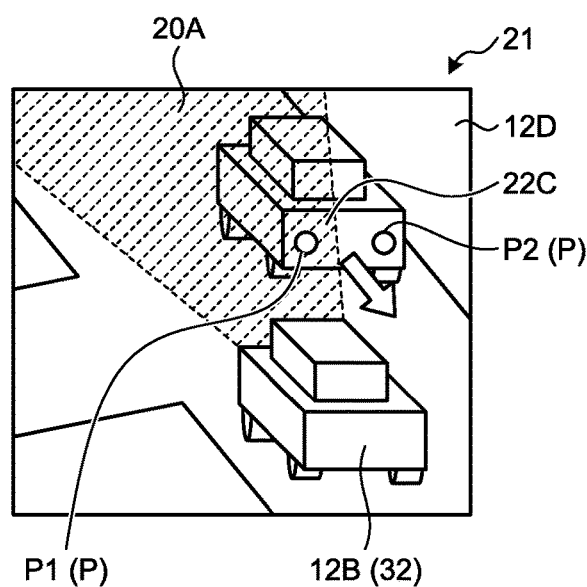

A process performed by the output control function 16N will be specifically described. FIGS. 16A and 16B are diagrams for explanation of sensing a state transition of a part P. For example, it is assumed that the occluded object 34 is a vehicle 12C. Then, it is assumed that, among parts P (direction indicators P1 and P2) on the vehicle 12C, the direction indicator P1 is located in the occluded region 22C.

FIG. 16A is a diagram illustrating a state where the direction indicator P1 is blinking. In that case, a pixel intensity of the direction indicator P1 is changed with time by blinking in a captured image 21 captured from the external apparatus 13. FIG. 16B is a captured image 21 indicating a state where the direction indicator P1 remains unilluminated. In that case, a pixel intensity of the direction indicator P1 is not changed in the captured image captured from the external apparatus 13.

In a case of the state illustrated in FIG. 16A where state transition is caused in the part P (direction indicator P1) in the occluded region 22C, the output control function 16N outputs output information. On the other hand, in a case of the state illustrated in FIG. 16B where state transition is not caused in the part P (direction indicator P1) in the occluded region 22C, the output control function 16N does not output output information.

As described above, the information processing apparatus 16 of the embodiment outputs output information when sensing the state transition of the part P in the occluded region 22C of the occluded object 34 (vehicle 12C) located in the blind spot 20A of the output-destination moving object 30.

Figure 17:
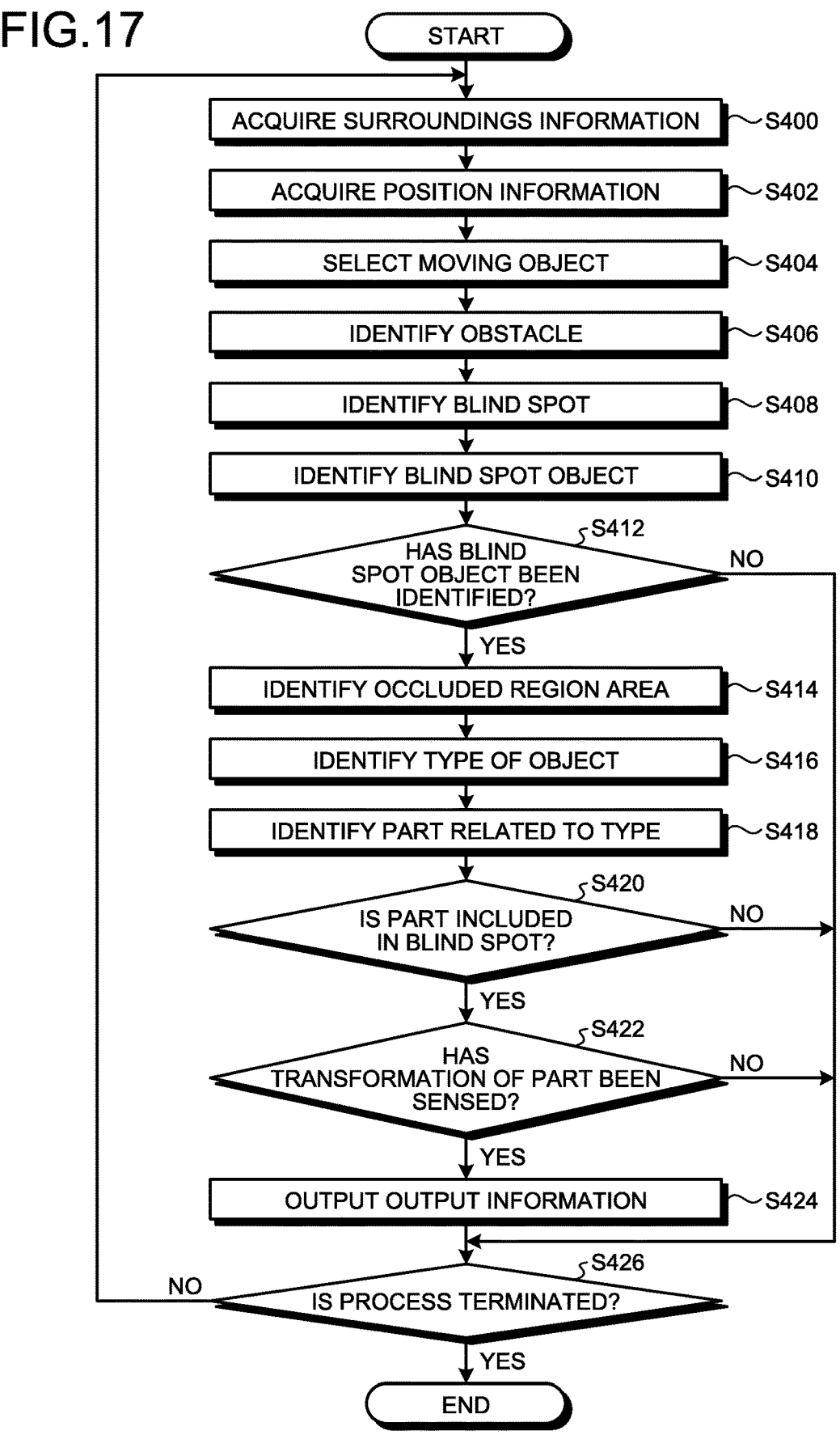
FIG. 17 is a flowchart illustrating an example of a procedure of a process executed by a processing circuit.

Next, a procedure of a process executed by the processing circuit 16A will be described. FIG. 17 is a flowchart illustrating an example of the procedure of the process executed by the processing circuit 16A.

The processing circuit 16A executes the process from Steps S400 to S420 in a manner similar to that of the processing circuit 14A. The process from Steps S400 to S420 corresponds to that from Steps S200 to S220 of the processing circuit 14A (see FIG. 14).

When it is positively determined in Step S420 (Step S420: Yes), the process proceeds to Step S422. In Step S422, it is determined whether the sensing function 16V of the output control function 16N has sensed the transformation of the part P (Step S422). When it is negatively determined in Step S422 (Step S422: No), the process proceeds to Step S426 described later. When it is positively determined in Step S422 (Step S422: Yes), the process proceeds to Step S424.

In Step S424, the output control function 16N controls the output circuit 14C to output output information (Step S424).

Next, the processing circuit 16A determines whether to terminate the process (Step S426). The determination in Step S426 may be performed in a manner similar to that in Step S224 (see FIG. 14). When it is negatively determined in Step S426 (Step S426: No), the process returns to Step S400 described above. On the other hand, when it is positively determined in Step S426 (Step S426: Yes), this routine is terminated.

As described above, the output control function 16N of the information processing apparatus 16 of the embodiment outputs output information when it is determined that the part P is included in the blind spot 20A and the state transition of the part P is sensed.

Therefore, in addition to the effect of the information processing apparatus 10 of the first embodiment, the information processing apparatus 16 of the embodiment can perform output in accordance with the state transition of the part P in the blind spot 20A. Accordingly, the information processing apparatus 16 of the embodiment can output information of the inside of the blind spot 20A more appropriately.

Fourth Embodiment

Figure 18:
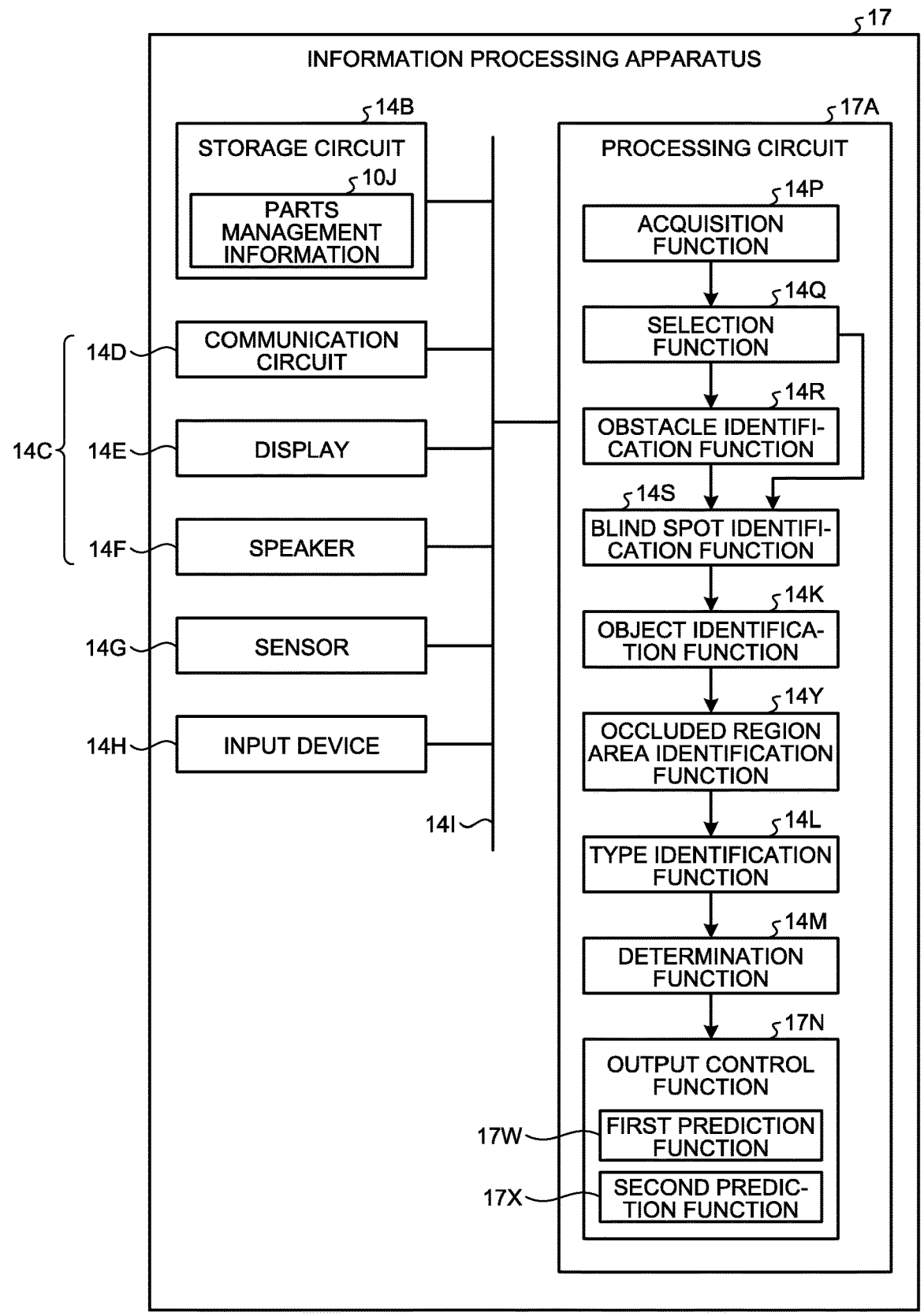
FIG. 18 is a block diagram illustrating an example of a configuration of an information processing apparatus according to a fourth embodiment.

FIG. 18 is a block diagram illustrating an example of a configuration of an information processing apparatus 17 of an embodiment. When a particular part P is included in a blind spot 20A, the information processing apparatus 17 predicts a moving direction of an occluded object 34 including the part P, and outputs output information in accordance with a prediction result.

The information processing apparatus 17 outputs output information in a manner similar to the information processing apparatuses 10, 14, and 16 of the above embodiments. The information processing apparatus 17 is, for example, a dedicated or general-purpose computer.

In the embodiment, a mode will be described in which the information processing apparatus 17 is mounted on an external apparatus 13 as that of the second embodiment. The information processing apparatus 17 may be mounted on an output-destination moving object 30 as that of the first embodiment.

The information processing apparatus 17 includes a processing circuit 17A, a storage circuit 14B, an output circuit 14C, a sensor 14G, and an input device 14H. The information processing apparatus 17 is similar to the information processing apparatus 14 of the second embodiment except that the processing circuit 17A is included therein instead of the processing circuit 14A.

The processing circuit 17A includes an acquisition function 14P, a selection function 14Q, an obstacle identification function 14R, a blind spot identification function 14S, an object identification function 14K, an occluded region identification function 14Y, a type identification function 14L, a determination function 14M, and an output control function 17N. The processing circuit 17A is similar to the processing circuit 14A except that the output control function 17N is included therein instead of the output control function 14N.

In a manner similar to the output control function 14N of the second embodiment, the output control function 17N outputs output information when it is determined that the part P is included in the blind spot 20A.

In the embodiment, the output control function 17N includes a first prediction function 17W and a second prediction function 17X. The first prediction function 17W and the second prediction function 17X predict motion of the occluded object 34 included in the blind spot 20A.

The first prediction function 17W is an example of a first prediction unit. The first prediction function 17W predicts a first moving direction of the occluded object 34 based on the part P in the blind spot 20A.

For example, the first prediction function 17W stores in advance a type of an object, a part P, and a first moving direction of the object related to a state of the part P. For example, a type of an object "human," a part P "a face," and a first moving direction "a direction along an orientation of the face" corresponding to a state of the part P "the orientation of the face," are associated with one another and stored in advance. For example, a type of an object "a vehicle," a part P "a direction indicator located on the right side of the vehicle," and a first moving direction "a right turn direction" corresponding to a state of the part P "blinking" are associated with one another and stored in advance. Furthermore, a first moving direction "a straight forward direction" corresponding to a state of the part P "unilluminated" may be associated therewith and stored. The association is not limited thereto.

Then, the first prediction function 17W reads the type of the occluded object 34, the type of the part P included in the blind spot 20A, and a first moving direction related to the state of the part P, thereby predicting the first moving direction of the object.

Figure 19:
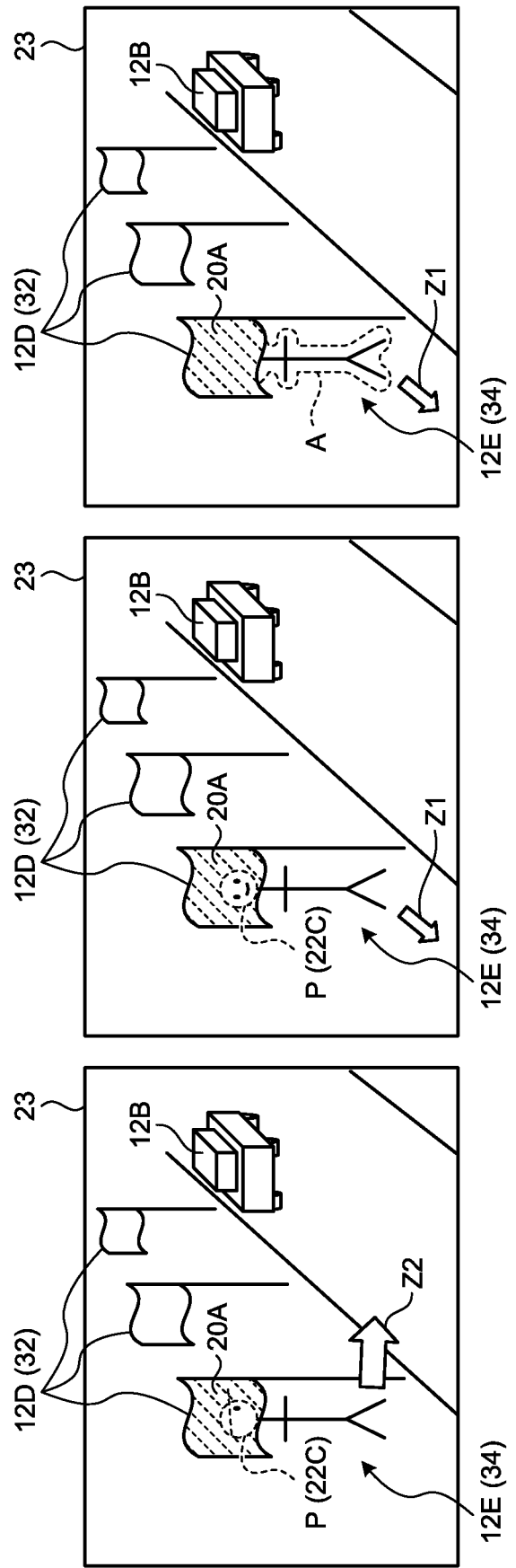
FIGS. 19A, 19B and 19C are diagrams for explaining motion prediction of an occluded object.

FIGS. 19A, 19B and 19C are diagrams for explaining motion prediction of an occluded object 34. FIGS. 19A, 19B and 19C illustrate an example in which a human 12E is present in a blind spot 20A using a stationary object 12D as an obstacle 32. In other words, FIGS. 19A, 19B and 19C illustrate a case where the occluded object 34 is the human 12E.

FIGS. 19A and 19B are diagrams for explaining prediction by the first prediction function 17W. In the examples illustrated in FIGS. 19A and 19B, the first prediction function 17W predicts, based on a part P in an occluded region 22C which is an area in the blind spot 20A in the occluded object 34 (human 12E) included in the blind spot 20A, a first direction of motion of the occluded object 34 (human 12E).

For example, the first prediction function 17W predicts a direction along an orientation of a human face which is the part P located in the blind spot 20A in the human 12E, as a first moving direction of the human 12E.

It is assumed, as illustrated in FIG. 19A, that the orientation of the human face which is the part P in the occluded region 22C in the human 12E is in a direction intersecting a road (an arrow Z2 direction). In that case, the first prediction function 17W predicts the arrow Z2 direction which is a direction consistent with the orientation of the face as the first moving direction of the human 12E.

Alternatively, it is assumed, as illustrated in FIG. 19B, that the orientation of the human face which is the part P located in the blind spot 20A in the human 12E is in a direction along the road (an arrow Z1 direction). In that case, the first prediction function 17W predicts the arrow Z1 direction which is a direction consistent with the orientation of the face as the first moving direction of the human 12E.

Next, the second prediction function 17X will be described. The second prediction function 17X is an example of a second prediction unit. The second prediction function 17X predicts a second moving direction of the occluded object 34 based on a visible region outside the blind spot 20A in the occluded object 34.

FIG. 19C is a diagram for explaining prediction by the second prediction function 17X. In the example illustrated in FIG. 19C, the second prediction function 17X predicts, from a change in a position of a visible region A outside the blind spot 20A in the occluded object 34, a moving direction of the visible region A as the second moving direction of the human 12E.

For example, the second prediction function 17X tracks, using captured images 23 captured at different timing, the position of the human 12E (occluded object 34) in the captured images 23, and predicts a direction toward a position of the human 12E in the captured image 23 captured this time from a position of the human 12E in the captured image 23 captured last time or last time but one, as the second moving direction.

In a case where the captured image 23 illustrated in FIG. 19C is obtained, the second prediction function 17X predicts the arrow Z1 direction along the road as the second moving direction obtained from the visible region A of the human 12E.

Then, the output control function 17N outputs output information when it is determined that the part P is included in the blind spot 20A and the first moving direction and the second moving direction are inconsistent with each other.

Specifically, it is assumed that the first prediction function 17W has predicted the arrow Z2 direction as the first moving direction of the occluded object 34 (human 12E) (see FIG. 19A), and that the second prediction function 17X has predicted the arrow Z1 direction as the second moving direction of the occluded object 34 (human 12E) (see FIG. 19C). In that case, the first moving direction (arrow Z2 direction) and the second moving direction (arrow Z1 direction) are inconsistent with each other. Accordingly, in that case, the output control function 17N controls the output circuit 14C to output output information.

On the other hand, it is assumed that the first prediction function 17W has predicted the arrow Z1 direction as the first moving direction of the occluded object 34 (human 12E) (see FIG. 19B), and that the second prediction function 17X has predicted the arrow Z1 direction as the second moving direction of the occluded object 34 (human 12E) (see FIG. 19C). In that case, the first moving direction (arrow Z1 direction) and the second moving direction (arrow Z1 direction) are consistent with each other. Accordingly, in that case, the output control function 17N does not output output information.

Figure 20:
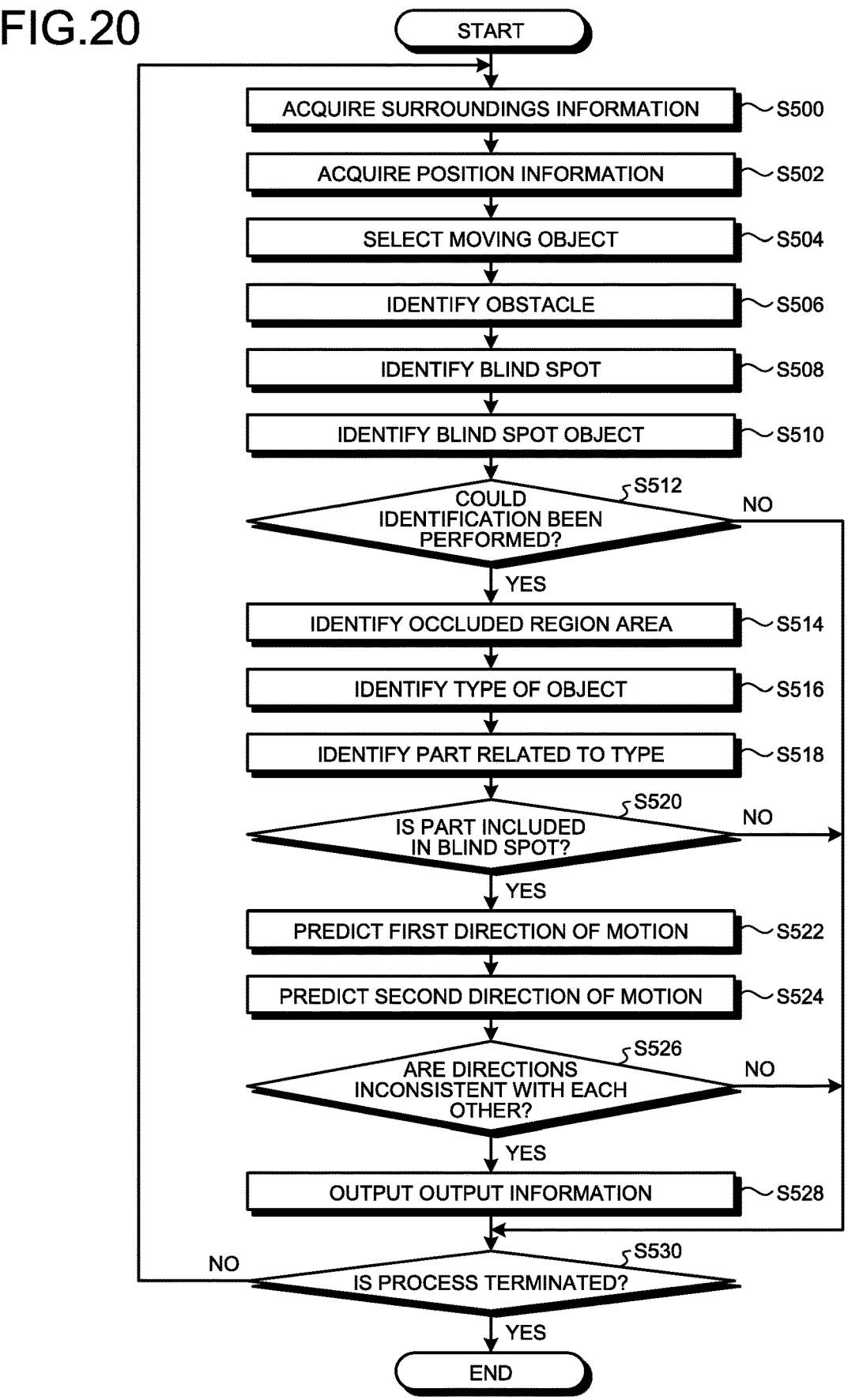
FIG. 20 is a flowchart illustrating an example of a procedure of a process executed by a processing circuit.

Next, a procedure of a process executed by the processing circuit 17A will be described. FIG. 20 is a flowchart illustrating an example of the procedure of the process executed by the processing circuit 17A.

The processing circuit 17A executes the process from Steps S500 to S520 in a manner similar to that of the processing circuit 14A. The process from Steps S500 to S520 corresponds to the process from Steps S200 to S220 executed by the processing circuit 14A (see FIG. 14).

When it is positively determined in Step S520 (Step S520: Yes), the process proceeds to Step S522. In Step S522, the first prediction function 17W of the output control function 17N predicts a first moving direction (Step S522). Next, the second prediction function 17X of the output control function 17N predicts a second moving direction (Step S524).

Next, the output control function 17N determines whether the first moving direction predicted in Step S522 and the second moving direction predicted in Step S524 are inconsistent with each other (Step S526).

When it is determined to be consistent with each other (Step S526: No), the process proceeds to Step S530 described later. On the other hand, when it is determined to be inconsistent with each other (Step S526: Yes), the process proceeds to Step S528. In Step S528, the output control function 17N controls the output circuit 14C to output output information (Step S528).

Next, the processing circuit 17A determines whether to terminate the process (Step S530). The determination in Step S530 may be performed in a manner similar to that in Step S224 (see FIG. 14). When it is negatively determined in Step S530 (Step S530: No), the process returns to Step S500 described above. On the other hand, when it is positively determined in Step S530 (Step S530: Yes), this routine is terminated.

As described above, the output control function 17N of the information processing apparatus 17 of the embodiment includes the first prediction function 17W and the second prediction function 17X.

The first prediction function 17W predicts the first moving direction of the occluded object 34 based on the part P in the blind spot 20A in the occluded object 34. The second prediction function 17X predicts the second moving direction of the occluded object 34 based on the visible region A outside the blind spot 20A in the occluded object 34. Then, the output control function 17N outputs output information when it is determined that the part P is included in the blind spot 20A and the first moving direction and the second moving direction are inconsistent with each other.

As described above, in the embodiment, the information processing apparatus 17 outputs output information when, regarding the occluded object 34 included in the blind spot 20A, the second moving direction predicted from the visible region A outside the blind spot 20A in the occluded object 34 and the first moving direction predicted based on the part P in the blind spot 20A in the occluded object 34 are inconsistent with each other.

Therefore, the information processing apparatus 17 of the embodiment can output output information in a case where, when an object is included in the blind spot 20A of the output-destination moving object 30, the object exhibits motion different from a moving direction predicted by a driver on the output-destination moving object 30.

Accordingly, in addition to the effect of the information processing apparatus 10 of the first embodiment, the information processing apparatus 17 of the embodiment can output information of the inside of the blind spot 20A more appropriately.

Figure 21:
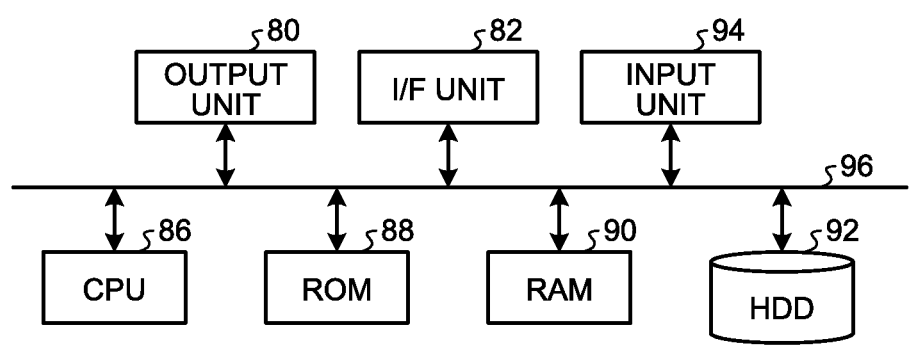
FIG. 21 is a hardware configuration diagram.

Next, an example of a hardware configuration of the information processing apparatuses 10, 14, 16, and 17 of the above embodiments will be described. FIG. 21 is an example of a hardware configuration diagram of the information processing apparatuses 10, 14, 16, and 17 of the above embodiments.

The information processing apparatuses 10, 14, 16, and 17 of the above embodiments each include a control device, a storage device, an I/F unit 82, an output unit 80, an input unit 94, and a bus 96, and have a hardware configuration using an ordinary computer. The control device is, for example, a central processing unit (CPU) 86. Examples of the storage device include a read only memory (ROM) 88, a random access memory (RAM) 90, and a hard disk drive (HDD) 92. The I/F unit 82 is an interface with various devices. The output unit 80 outputs various kinds of information such as output information. The input unit 94 receives an operation by a user. The bus 96 connects each unit.

In the information processing apparatuses 10, 14, 16, and 17 of the above embodiments, each function described above is realized on the computer by the CPU 86 reading a program from the ROM 88 on the RAM 90 and executing the program.

The program for executing each process described above executed by the information processing apparatuses 10, 14, 16, and 17 of the above embodiments may be stored in the HDD 92. The program for executing each process described above executed by the information processing apparatuses 10, 14, 16, and 17 of the above embodiments may be incorporated in the ROM 88 in advance and provided.

The programs for executing the processes described above executed by the information processing apparatuses 10, 14, 16, and 17 of the above embodiments may be stored, in an installable file format or an executable file format, in a computer-readable storage medium such as a CD-ROM, a CD-R, a memory card, a digital versatile disk (DVD), a flexible disk (FD), and provided as a computer program product. The programs for executing the processes described above executed by the information processing apparatuses 10, 14, 16, and 17 of the above embodiments may be stored in a computer connected to a network such as the Internet, and provided by allowing download thereof through the network. The programs for executing the processes described above executed by the information processing apparatuses 10, 14, 16, and 17 of the above embodiments may be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory: and
processing circuitry configured to:
   determine whether a particular part, constituting a part of an object having a type related to the object, is included in a blind spot of an object of interest; and
   control output of output information based on determining that the particular part is included in the blind spot, wherein
the processing circuitry is configured to:
predict a first moving direction of the object based on the particular part in the blind spot in the object; and
predict a second moving direction of the object based on the visible region of the object outside the blind spot, and control output of the output information based on determining that the particular part is included in the blind spot and the first moving direction and the second moving direction are inconsistent with each other.

2. The information processing apparatus according to claim 1, wherein the processing circuitry is configured to determine whether the particular part included in the blind spot is included in the blind spot.

3. The information processing apparatus according to claim 1, wherein the processing circuitry is configured to determine whether the particular part is included in the blind spot when receiving request information from the object of interest.

4. The information processing apparatus according to claim 1, wherein the processing circuitry is configured to determine whether the particular part is included in the blind spot based on a visible region of the object outside the blind spot.

5. The information processing apparatus according to claim 1, wherein the processing circuitry is configured to:
   acquire surroundings information of the object of interest and position information of the object of interest;
   identify the blind spot in an environment where the object of interest moves based on the surroundings information and the position information;
   identify the object included in the blind spot; and
   identify the type of the object, wherein
   the particular part is determined to be included in the blind spot when the particular part is included in the blind spot of the object of interest in the surroundings information.

6. The information processing apparatus according to claim 1, wherein the output information includes at least one of information regarding the blind spot, information regarding the particular part included in the blind spot, and information regarding the object included in the blind spot.

7. The information processing apparatus according to claim 1, wherein the particular part indicates motion of the object or motion plan of the object, or both.

8. The information processing apparatus according to claim 1, wherein the information processing apparatus is mounted on the object of interest, the object, or an external apparatus other than the object of interest and the object.

9. The information processing apparatus according to claim 1, wherein the processing circuitry is configured to acquire surroundings information of at least the object of interest sensed by a sensor, and determine whether the particular part is included based on the acquired surroundings information.

10. The information processing apparatus according to claim 9, wherein the sensor comprises a distance sensor or an image capturing apparatus, or both.

11. An information processing method comprising:
   determining whether a particular part, constituting a part of an object having a type related to the object, is included in a blind spot of an object of interest;
   controlling output of output information based on determining that the particular part is included in the blind spot, wherein
   a first moving direction of the object is predicted based on the particular part in the blind spot in the object, and a second moving direction of the object is predicted based on the visible region of the object outside the blind spot; and
   the controlling controls output of the output information based on determining that the particular part is included in the blind spot and the first moving direction and the second moving direction are inconsistent with each other.

\* \* \* \* \*